(12) United States Patent
Zhang et al.

(10) Patent No.: US 11,843,495 B2
(45) Date of Patent: Dec. 12, 2023

(54) GUARD INTERVAL BASED WAVEFORM

(71) Applicant: QUALCOMM Incorporated, San Diego, CA (US)

(72) Inventors: Xiaoxia Zhang, San Diego, CA (US); Jing Sun, San Diego, CA (US); Jun Ma, San Diego, CA (US); Raviteja Patchava, San Diego, CA (US); Morteza Soltani, San Diego, CA (US); Tao Luo, San Diego, CA (US); Iyab Issam Sakhnini, San Diego, CA (US); Hemant Saggar, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/445,124

(22) Filed: Aug. 16, 2021

(65) Prior Publication Data
US 2023/0051510 A1 Feb. 16, 2023

(51) Int. Cl.
*H04L 27/26* (2006.01)

(52) U.S. Cl.
CPC ........ *H04L 27/2636* (2013.01); *H04L 27/261* (2013.01); *H04L 27/2607* (2013.01)

(58) Field of Classification Search
CPC H04L 27/2607; H04L 27/261; H04L 27/2636
See application file for complete search history.

(56) References Cited

U.S. PATENT DOCUMENTS

| 2016/0380689 A1* | 12/2016 | Sun | H04L 1/206 370/330 |
| 2018/0198662 A1* | 7/2018 | Sahin | H04L 25/03834 |
| 2019/0097859 A1* | 3/2019 | Bala | H04L 27/26132 |

\* cited by examiner

*Primary Examiner* — David B Lugo
(74) *Attorney, Agent, or Firm* — Harrity & Harrity, LLP

(57) ABSTRACT

Various aspects of the present disclosure generally relate to wireless communication. In some aspects, a user equipment (UE) or a base station may generate a discrete Fourier transform (DFT) waveform from separate DFT inputs of data content, a guard interval (GI) sequence, and tail suppression samples. The UE or the base station may generate a first communication with the DFT waveform using an inverse fast Fourier transform (IFFT) operation. The first communication may include, in a time domain, a data signal corresponding to the data content and a GI-based tail signal that corresponds to the GI sequence and that is suppressed with a tail suppression signal based at least in part on the tail suppression samples. The UE or the base station may transmit the first communication. Numerous other aspects are described.

30 Claims, 18 Drawing Sheets

GUARD INTERVAL BASED WAVEFORM

FIELD OF THE DISCLOSURE

Aspects of the present disclosure generally relate to wireless communication and to techniques and apparatuses for generating guard interval based waveforms.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include generating a discrete Fourier transform (DFT) waveform from separate DFT inputs of data content, a guard interval (GI) sequence, and tail suppression samples. The method may include generating a first communication with the DFT waveform using an inverse fast Fourier transform (IFFT) operation. The first communication may include, in a time domain, a data signal corresponding to the data content and a GI-based tail signal that corresponds to the GI sequence and that is suppressed with a tail suppression signal based at least in part on the tail suppression samples. The method may include transmitting the first communication.

Some aspects described herein relate to a method of wireless communication performed by a base station. The method may include transmitting, to a UE, an indication of tail suppression samples that the UE is to use for generating a DFT waveform from separate DFT inputs of data content, a GI sequence, and the tail suppression samples. The method may include receiving a first communication that includes a data signal corresponding to the data content, a GI-based tail signal that corresponds to the GI sequence, and a tail suppression signal that corresponds to the tail suppression samples.

Some aspects described herein relate to a method of wireless communication performed by a UE. The method may include generating a DFT waveform from separate DFT inputs of data content and a tail value. The method may include generating a first communication with the DFT waveform using an IFFT operation. The first communication may include, in a time domain, a data signal corresponding to the data content and a tail signal that corresponds to the tail value. The method may include transmitting the first communication in a first symbol. The method may include transmitting a second communication in a second symbol using a copy of the tail signal used for the first communication as a GI for a data signal of the second communication.

Some aspects described herein relate to a method of wireless communication performed by a base station. The method may include generating a discrete Fourier transform (DFT) waveform from separate DFT inputs of data content, a guard interval (GI) sequence, and tail suppression samples. The method may include generating a first communication with the DFT waveform using an inverse fast Fourier transform (IFFT) operation. The first communication may include, in a time domain, a data signal corresponding to the data content and a GI-based tail signal that corresponds to the GI sequence and that is suppressed with a tail suppression signal based at least in part on the tail suppression samples. The method may include transmitting the first communication.

Some aspects described herein relate to a UE for wireless communication. The UE may include a memory and one or more processors coupled to the memory. The one or more processors may be configured to generate a DFT waveform from separate DFT inputs of data content, a GI sequence, and tail suppression samples. The one or more processors may be configured to generate a first communication with the DFT waveform using an IFFT operation. The first communication may include, in a time domain, a data signal corresponding to the data content and a GI-based tail signal that corresponds to the GI sequence and that is suppressed with a tail suppression signal based at least in part on the tail suppression samples. The one or more processors may be configured to transmit the first communication.

Some aspects described herein relate to a base station for wireless communication. The base station may include a memory and one or more processors coupled to the memory. The one or more processors may be configured to transmit, to a UE, an indication of tail suppression samples that the UE is to use for generating a DFT waveform from separate DFT inputs of data content, a GI sequence, and the tail suppression samples. The one or more processors may be configured to receive a first communication that includes a data signal corresponding to the data content, a GI-based tail signal that corresponds to the GI sequence, and a tail suppression signal that corresponds to the tail suppression samples.

Some aspects described herein relate to a UE for wireless communication. The UE may include a memory and one or more processors coupled to the memory. The one or more processors may be configured to generate a DFT waveform from separate DFT inputs of data content and a tail value. The one or more processors may be configured to generate a first communication with the DFT waveform using an IFFT operation. The first communication may include, in a time domain, a data signal corresponding to the data content and a tail signal that corresponds to the tail value. The one or more processors may be configured to transmit the first communication in a first symbol. The one or more processors may be configured to transmit a second communication in a second symbol using a copy of the tail signal used for the first communication as a GI for a data signal of the second communication.

Some aspects described herein relate to a base station for wireless communication. The base station may include a memory and one or more processors coupled to the memory. The one or more processors may be configured to generate a DFT waveform from separate DFT inputs of data content, a GI sequence, and tail suppression samples. The one or more processors may be configured to generate a first communication with the DFT waveform using an IFFT operation. The first communication may include, in a time domain, a data signal corresponding to the data content and a GI-based tail signal that corresponds to the GI sequence and that is suppressed with a tail suppression signal based at least in part on the tail suppression samples. The one or more processors may be configured to transmit the first communication.

Some aspects described herein relate to a non-transitory computer-readable medium that stores a set of instructions for wireless communication by a UE. The set of instructions, when executed by one or more processors of the UE, may cause the UE to generate a DFT waveform from separate DFT inputs of data content, a GI sequence, and tail suppression samples. The set of instructions, when executed by one or more processors of the UE, may cause the UE to generate a first communication with the DFT waveform using an IFFT operation. The first communication may include, in a time domain, a data signal corresponding to the data content and a GI-based tail signal that corresponds to the GI sequence and that is suppressed with a tail suppression signal based at least in part on the tail suppression samples. The set of instructions, when executed by one or more processors of the UE, may cause the UE to transmit the first communication.

Some aspects described herein relate to a non-transitory computer-readable medium that stores a set of instructions for wireless communication by a base station. The set of instructions, when executed by one or more processors of the base station, may cause the base station to transmit, to a UE, an indication of tail suppression samples that the UE is to use for generating a DFT waveform from separate DFT inputs of data content, a GI sequence, and the tail suppression samples. The set of instructions, when executed by one or more processors of the base station, may cause the base station to receive a first communication that includes a data signal corresponding to the data content, a GI-based tail signal that corresponds to the GI sequence, and a tail suppression signal that corresponds to the tail suppression samples.

Some aspects described herein relate to a non-transitory computer-readable medium that stores a set of instructions for wireless communication by a UE. The set of instructions, when executed by one or more processors of the UE, may cause the UE to generate a DFT waveform from separate DFT inputs of data content and a tail value. The set of instructions, when executed by one or more processors of the UE, may cause the UE to generate a first communication with the DFT waveform using an IFFT operation. The first communication may include, in a time domain, a data signal corresponding to the data content and a tail signal that corresponds to the tail value. The set of instructions, when executed by one or more processors of the UE, may cause the UE to transmit the first communication in a first symbol. The set of instructions, when executed by one or more processors of the UE, may cause the UE to transmit a second communication in a second symbol using a copy of the tail signal used for the first communication as a GI for a data signal of the second communication.

Some aspects described herein relate to a non-transitory computer-readable medium that stores a set of instructions for wireless communication by a base station. The set of instructions, when executed by one or more processors of the base station, may cause the base station to generate a DFT waveform from separate DFT inputs of data content, a GI sequence, and tail suppression samples. The set of instructions, when executed by one or more processors of the base station, may cause the base station to generate a first communication with the DFT waveform using an IFFT operation. The first communication may include, in a time domain, a data signal corresponding to the data content and a GI-based tail signal that corresponds to the GI sequence and that is suppressed with a tail suppression signal based at least in part on the tail suppression samples. The set of instructions, when executed by one or more processors of the base station, may cause the base station to transmit the first communication.

Some aspects described herein relate to an apparatus for wireless communication. The apparatus may include means for generating a DFT waveform from separate DFT inputs of data content, a GI sequence, and tail suppression samples. The apparatus may include means for generating a first communication with the DFT waveform using an IFFT operation. The first communication may include, in a time domain, a data signal corresponding to the data content and a GI-based tail signal that corresponds to the GI sequence and that is suppressed with a tail suppression signal based at least in part on the tail suppression samples. The apparatus may include means for transmitting the first communication.

Some aspects described herein relate to an apparatus for wireless communication. The apparatus may include means for transmitting, to a UE, an indication of tail suppression samples that the UE is to use for generating a DFT waveform from separate DFT inputs of data content, a GI sequence, and the tail suppression samples. The apparatus may include means for receiving a first communication that includes a data signal corresponding to the data content, a GI-based tail signal that corresponds to the GI sequence, and a tail suppression signal that corresponds to the tail suppression samples.

Some aspects described herein relate to an apparatus for wireless communication. The apparatus may include means for generating a DFT waveform from separate DFT inputs of data content and a tail value. The apparatus may include means for generating a first communication with the DFT waveform using an IFFT operation. The first communication may include, in a time domain, in a time domain, a data signal corresponding to the data content and a tail signal that corresponds to the tail value. The apparatus may include means for transmitting the first communication in a first symbol. The apparatus may include means for transmitting a second communication in a second symbol using a copy of the tail signal used for the first communication as a GI for a data signal of the second communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
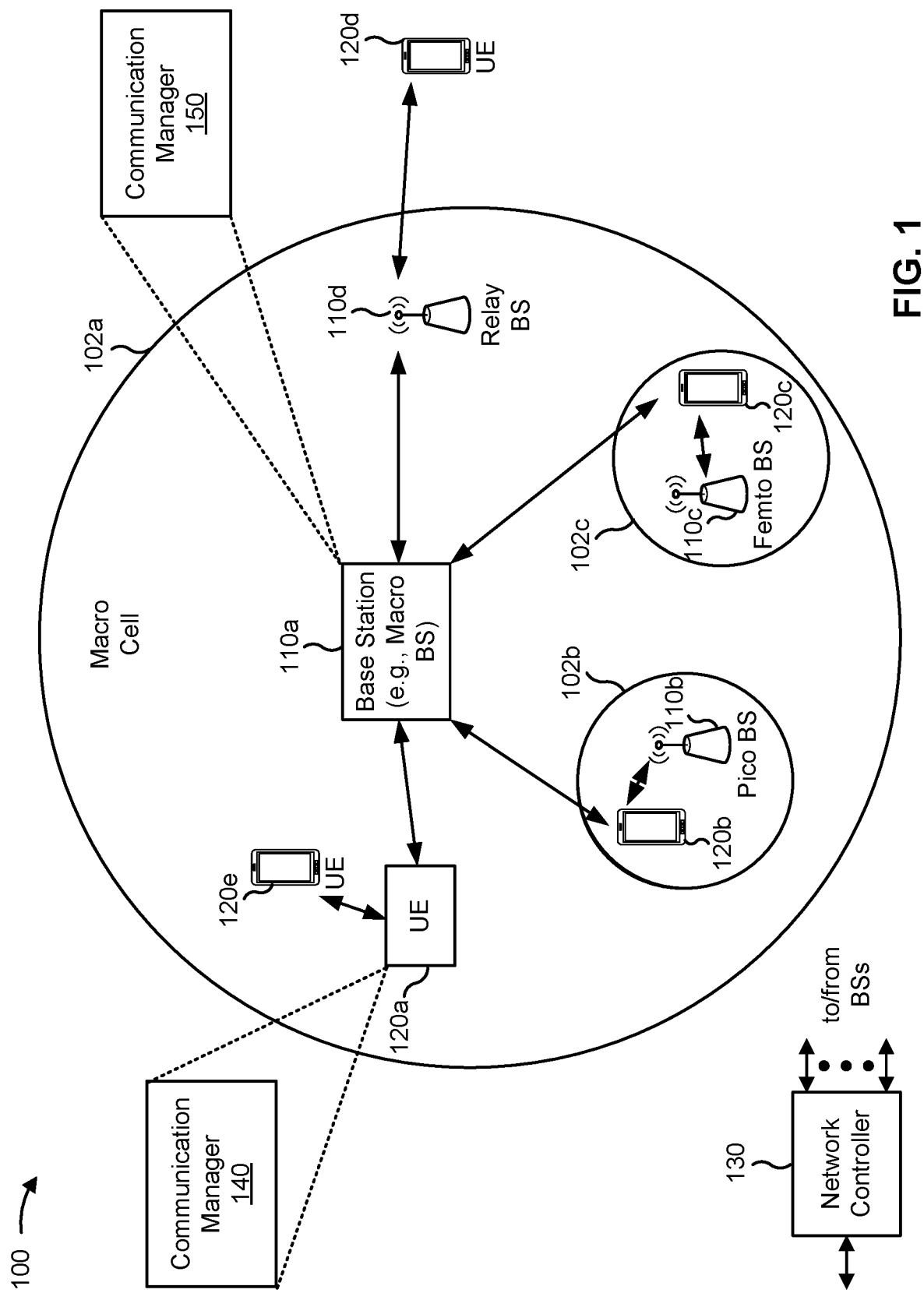
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V21) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may generate a discrete Fourier transform (DFT) waveform from separate DFT inputs of data content, a guard interval (GI) sequence, and tail suppression samples. The communication manager 140 may generate a first communication with the DFT waveform using an inverse fast Fourier transform (IFFT) operation. The first communication may include, in a time domain, a data signal corresponding to the data content and a GI-based tail signal that corresponds to the GI sequence and that is suppressed with a tail suppression signal based at least in part on the tail suppression samples. The communication manager 140 may transmit the first communication. Additionally, or alternatively, the communication manager 140 may perform one or more other operations described herein.

In some aspects, the base station 110 may include a communication manager 150. As described in more detail elsewhere herein, the communication manager 150 may transmit, to a UE, an indication of tail suppression samples that the UE is to use for generating a DFT waveform from separate DFT inputs of data content, a GI sequence, and the tail suppression samples. The communication manager 150 may receive a first communication that includes a data signal corresponding to the data content, a GI-based tail signal that corresponds to the GI sequence, and a tail suppression signal that corresponds to the tail suppression samples. Additionally, or alternatively, the communication manager 150 may perform one or more other operations described herein.

In some aspects, the UE 120 may include a communication manager 140. As described in more detail elsewhere herein, the communication manager 140 may generate a DFT waveform from separate DFT inputs of data content and a tail value and generate a first communication with the DFT waveform using an IFFT operation. The first communication may include, in a time domain, a data signal corresponding to the data content and a tail signal that corresponds to the tail value; transmit the first communication in a first symbol. The communication manager 140 may transmit a second communication in a second symbol using a copy of the tail signal used for the first communication as a GI for a data signal of the second communication. Additionally, or alternatively, the communication manager 140 may perform one or more other operations described herein.

In some aspects, the base station 110 may include a communication manager 150. As described in more detail elsewhere herein, the communication manager 150 may generate a DFT waveform from separate DFT inputs of data content, a GI sequence, and tail suppression samples. The communication manager 150 may generate a first communication with the DFT waveform using an IFFT operation. The first communication may include, in a time domain, a data signal corresponding to the data content and a GI-based tail signal that corresponds to the GI sequence and that is suppressed with a tail suppression signal based at least in part on the tail suppression samples. The communication manager 150 may transmit the first communication. Additionally, or alternatively, the communication manager 150 may perform one or more other operations described herein.

As indicated above, FIG. 1 is provided as an example. Other examples may differ from what is described with regard to FIG. 1.

Figure 2:
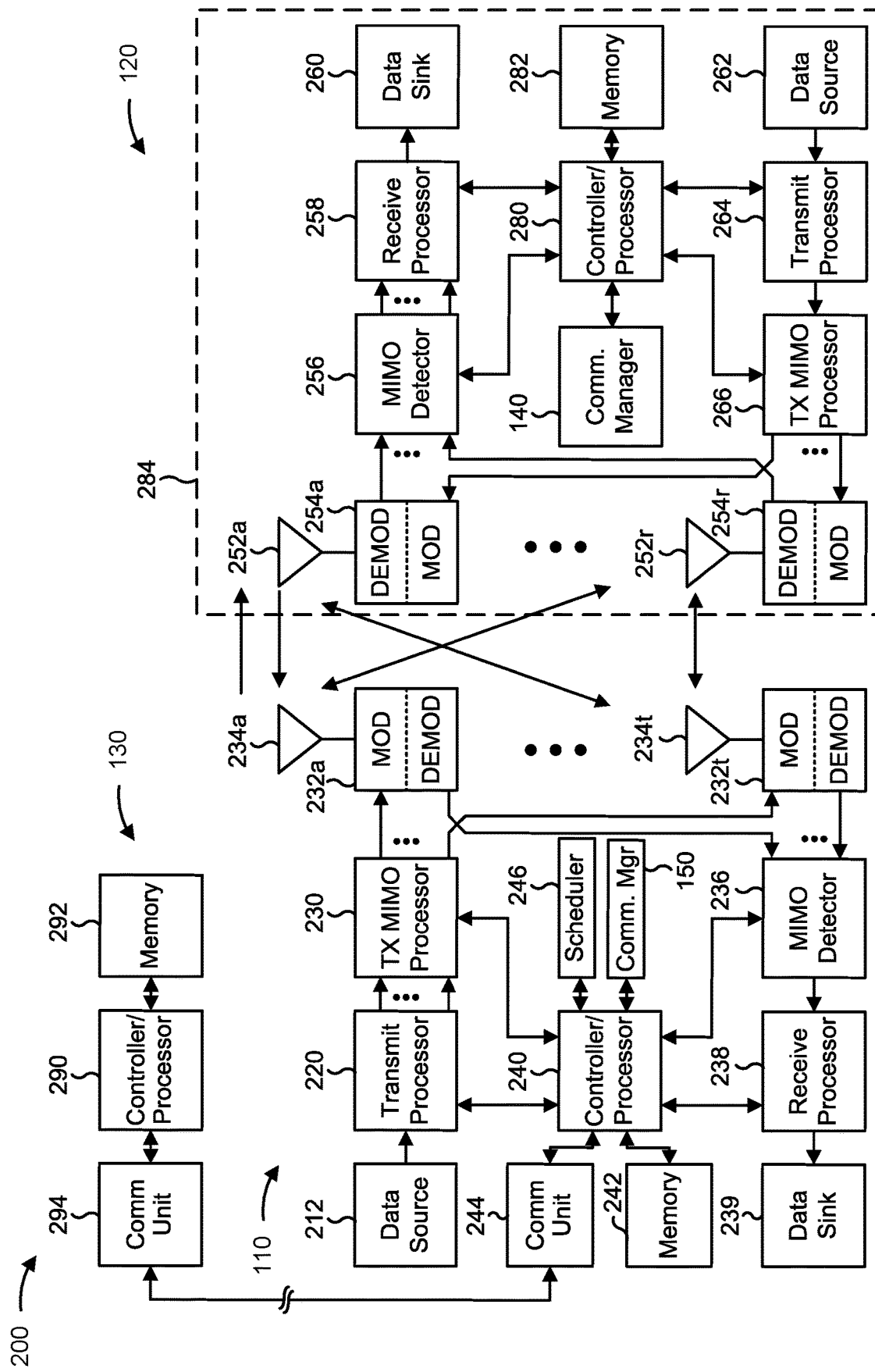
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-18).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-18).

The controller/processor 240 of the base station 110, the controller/processor 280 of the UE 120, and/or any other component(s) of FIG. 2 may perform one or more techniques associated with generating a GI-based waveform, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, the UE 120 includes means for generating a DFT waveform from separate DFT inputs of data content, a GI sequence, and tail suppression samples; means for generating a first communication with the DFT waveform using an IFFT operation, where the first communication includes, in a time domain, a data signal corresponding to the data content and a GI-based tail signal that corresponds to the GI sequence and that is suppressed with a tail suppression signal based at least in part on the tail suppression samples; and/or means for transmitting the first communication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, an indication of tail suppression samples that the UE is to use for generating a DFT waveform from separate DFT inputs of data content, a GI sequence, and the tail suppression samples; and/or means for receiving a first communication that includes a data signal corresponding to the data content, a GI-based tail signal that corresponds to the GI sequence, and a tail suppression signal that corresponds to the tail suppression samples. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for generating a DFT waveform from separate DFT inputs of data content and a tail value; means for generating a first communication with the DFT waveform using an IFFT operation, wherein the first communication includes, in a time domain, a data signal corresponding to the data content and a tail signal that corresponds to the tail value; means for transmitting the first communication in a first symbol; and/or means for transmitting a second communication in a second symbol using a copy of the tail signal used for the first communication as a GI for a data signal of the second communication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for generating a DFT waveform from separate DFT inputs of data content, a GI sequence, and tail suppression samples; means for generating a first communication with the DFT waveform using an IFFT operation, where the first communication includes, in a time domain, a data signal corresponding to the data content and a GI-based tail signal that corresponds to the GI sequence and that is suppressed with a tail suppression signal based at least in part on the tail suppression samples; and/or means for transmitting the first communication. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
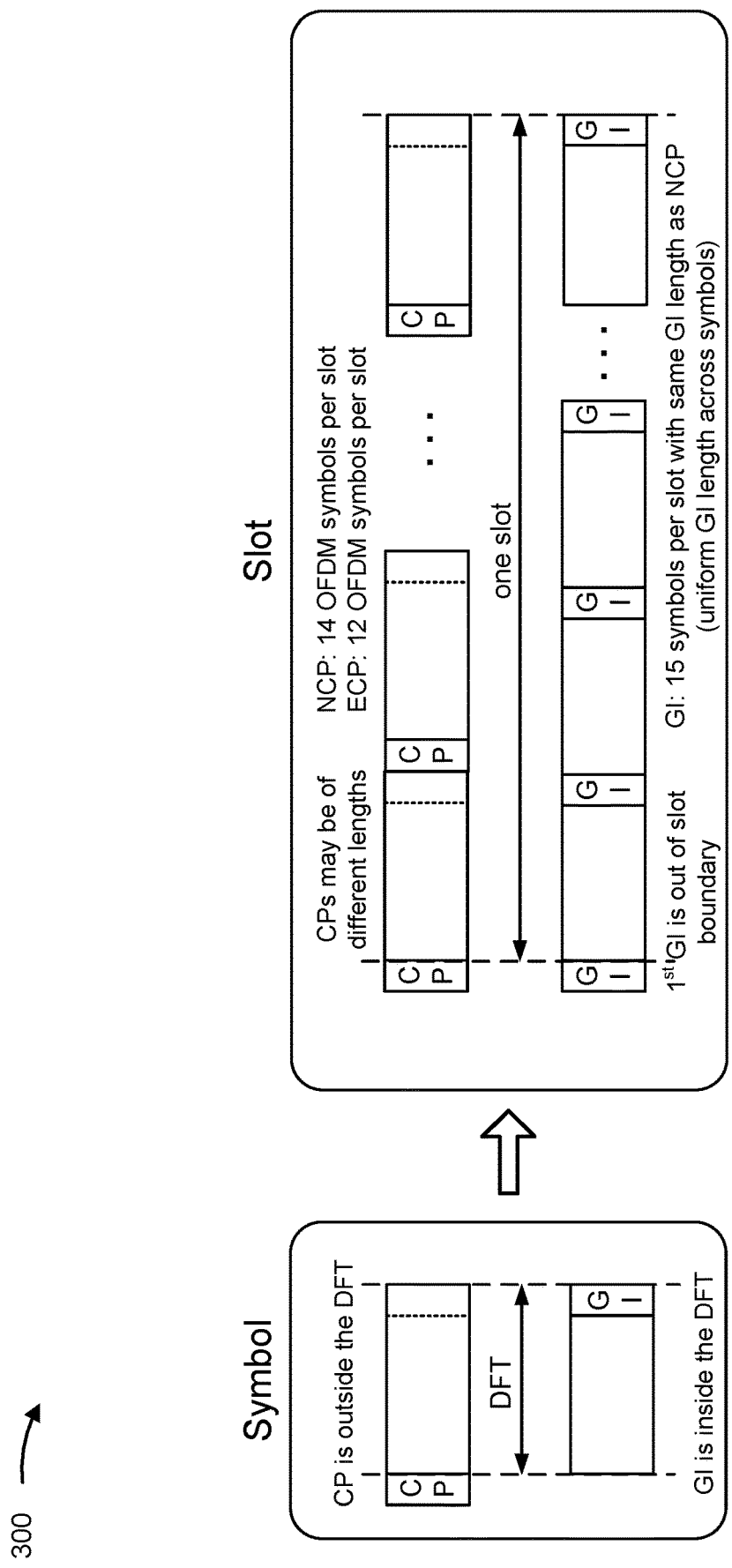
FIG. 3 is a diagram illustrating an example of a cyclic prefix (CP) and a guard interval (GI) for single carrier (SC) waveforms, in accordance with the present disclosure.

FIG. 3 is a diagram illustrating an example 300 of a cyclic prefix (CP) and a GI for single carrier (SC) waveforms, in accordance with the present disclosure.

A transmitter, such as the UE 120 or the base station 110, may include a short amount of data or space between symbols to mitigate interference between neighboring symbols. The short amount of data may be a CP, or a prefixing of a symbol, as shown in example 300. The CP may also provide an opportunity for a beam to switch between symbols. The CP may be contained within a slot boundary, may include random data, and may not be easily adaptable to delay spread, which is a difference between arrival of an earliest multi-path component and arrival of a last multi-path component. CPs may be of different lengths. CP is adopted in Long Term Evolution (LTE) and NR, and CP is adopted for WiFi OFDM symbols.

The transmitter may also use a GI between symbols. The GI may be a specified period of time between symbols, to mitigate interference between the symbols. The GI may be a known sequence that can be utilized for synchronizing phase tracking. The GI may be of uniform length across symbols. The GI may be more resource efficient than a CP. The GI may adapt to delay spreads without changing a symbol duration. The GI may be adopted for use with WiFi for SC frequency domain equalization (FDE) (SC-FDE).

The transmitter may use signal processing to generate a waveform for data content. The signal processing may involve linear convolution, which is an operation to calculate the output for a linear time invariant system. Linear convolution may use an FFT operation. A CP and a GI may both convert a linear convolution of transmitted symbols to a circular convolution, with a simple one-tap FDE at the receiver. Circular convolution calculates the output for a linear time invariant system but is periodic and utilizes the periodicity of samples in DFT. A CP and a GI may also help to maintain symbol and slot alignment.

As indicated above, FIG. 3 is provided as an example. Other examples may differ from what is described with regard to FIG. 3.

Figure 4:
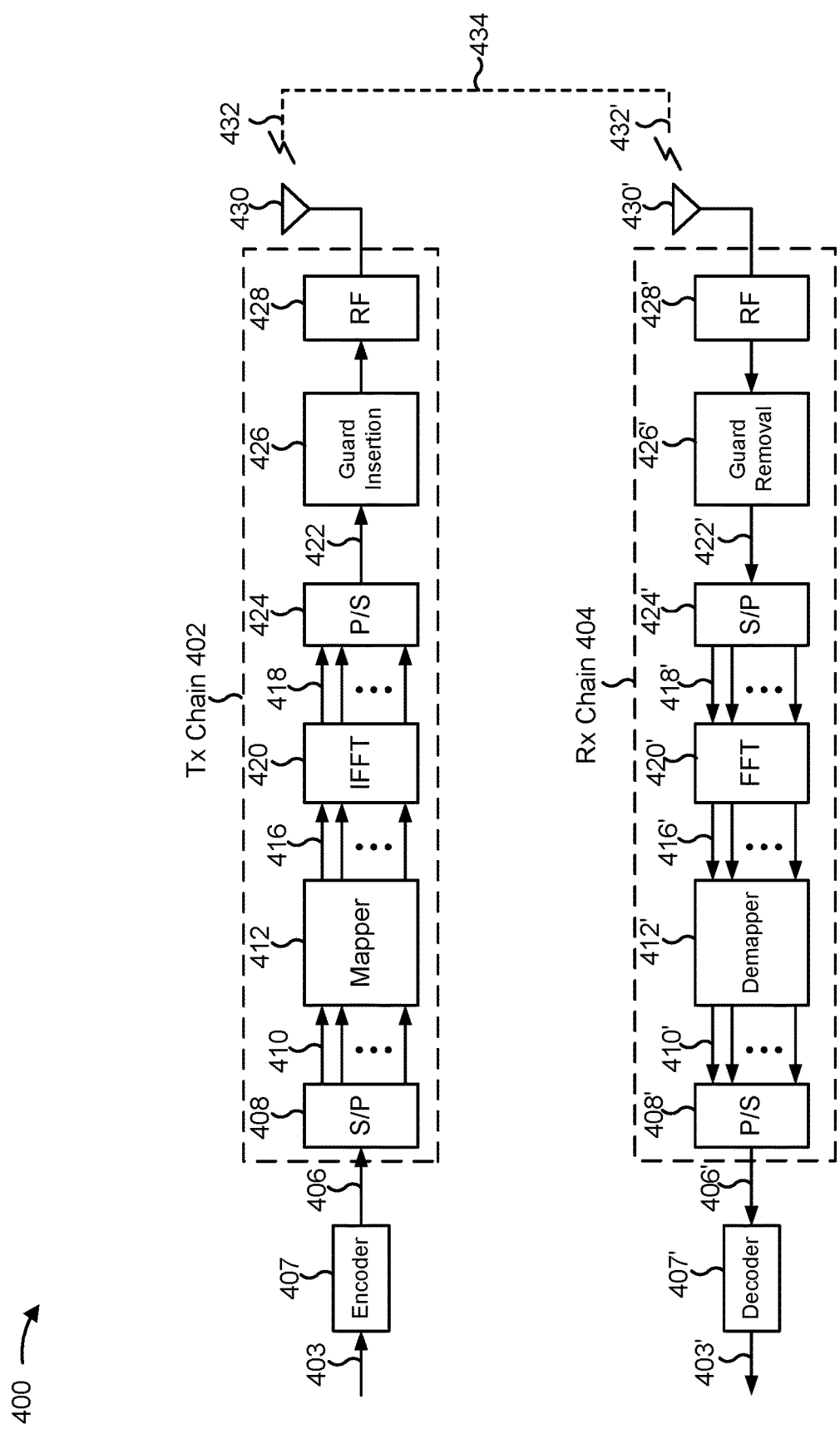
FIG. 4 is a diagram illustrating an example of a transmit chain and a receive chain of a wireless communication device, in accordance with the present disclosure.

FIG. 4 is a diagram illustrating an example 400 of a transmit (Tx) chain 402 and a receive (Rx) chain 404 of a wireless communication device, in accordance with the present disclosure. The wireless communication device may be a base station (e.g., base station 110 depicted in FIGS. 1-2) or a UE (e.g., UE 120). In some aspects, one or more components of Tx chain 402 may be implemented in transmit processor 264, TX MIMO processor 266, MOD/DEMOD 254, and/or controller/processor 280, as described above in connection with FIG. 2. In some aspects, Tx chain 402 may be implemented in the UE 120 for transmitting data 406 (e.g., uplink data, an uplink reference signal, uplink control information) to base station 110 on an uplink channel. In some aspects, one or more components of Tx chain 402 may be implemented in transmit processor 220, TX MIMO processor 230, MOD/DEMOD 234, and/or controller/processor 240, as described above in connection with FIG. 2. In some aspects, Tx chain 402 may be implemented in the base station 110 for transmitting data 406 (e.g., uplink data, an uplink reference signal, uplink control information, and/or the like) to the UE 120 on a downlink channel.

An encoder 407 may alter a signal (e.g., a bitstream) 403 into data 406. Data 406 to be transmitted is provided from encoder 407 as input to a serial-to-parallel (S/P) converter 408. In some aspects, S/P converter 408 may split the transmission data into N parallel data streams 410.

The N parallel data streams 410 may then be provided as input to a mapper 412. Mapper 412 may map the N parallel data streams 410 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 412 may output N parallel symbol streams 416, each symbol stream 416 corresponding to one of N orthogonal subcarriers of an IFFT component 420. These N parallel symbol streams 416 are represented in the frequency domain and may be converted into N parallel time domain sample streams 418 by IFFT component 420.

In some aspects, N parallel modulations in the frequency domain correspond to N modulation symbols in the frequency domain, which correspond to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 418 may be converted into an OFDM/OFDMA symbol stream 422 by a parallel-to-serial (P/S) converter 424. A guard insertion component 426 may insert a GI between successive OFDM/OFDMA symbols in the OFDM/OFDMA symbol stream 422. The output of guard insertion component 426 may then be upconverted to a desired transmit frequency band by a radio frequency (RF) front end 428. An antenna 430 may then transmit the resulting signal 432.

In some aspects, Rx chain 404 may utilize OFDM/OFDMA. In some aspects, one or more components of Rx chain 404 may be implemented in receive processor 258, MIMO detector 256, MOD/DEMOD 254, and/or controller/processor 280, as described above in connection with FIG. 2. In some aspects, Rx chain 404 may be implemented in the UE 120 for receiving data 406 (e.g., downlink data, a downlink reference signal, downlink control information, and/or the like) from the base station 110 on a downlink channel. In some aspects, one or more components of Rx chain 404 may be implemented in receive processor 238, MIMO detector 236, MOD/DEMOD 234, and/or controller/processor 240, as described above in connection with FIG. 2. In some aspects, Rx chain 404 may be implemented in the base station 110 for receiving data 406 (e.g., uplink data, an uplink reference signal, uplink control information, and/or the like) from the UE 120 on an uplink channel.

A transmitted signal 432 is shown traveling over a wireless channel 434 from Tx chain 402 to Rx chain 404. When a signal 432' is received by an antenna 430', the received signal 432' may be downconverted to a baseband signal by an RF front end 428'. A guard removal component 426' may then remove the GI that was inserted between OFDM/OFDMA symbols by guard insertion component 426.

The output of guard removal component 426' may be provided to an S/P converter 424'. The output may include an OFDM/OFDMA symbol stream 422', and S/P converter 424' may divide the OFDM/OFDMA symbol stream 422' into N parallel time-domain symbol streams 418', each of which corresponds to one of the N orthogonal subcarriers. An FFT component 420' may convert the N parallel time-domain symbol streams 418' into the frequency domain and output N parallel frequency-domain symbol streams 416'.

A demapper 412' may perform the inverse of the symbol mapping operation that was performed by mapper 412, thereby outputting N parallel data streams 410'. A P/S converter 408' may combine the N parallel data streams 410' into a single data stream 406'. Ideally, data stream 406' corresponds to data 406 that was provided as input to Tx chain 402. Data stream 406' may be decoded into a decoded data stream 403' by decoder 407'.

The number and arrangement of components shown in FIG. 4 are provided as an example. In practice, there may be additional components, fewer components, different components, or differently arranged components than those shown in FIG. 4. Furthermore, two or more components shown in FIG. 4 may be implemented within a single component, or a single component shown in FIG. 4 may be implemented as multiple, distributed components. Additionally, or alternatively, a set of components (e.g., one or more components) shown in FIG. 4 may perform one or more functions described as being performed by another set of components shown in FIG. 4.

As indicated above, FIG. 4 is provided as an example. Other examples may differ from what is described with regard to FIG. 4.

Figure 5:
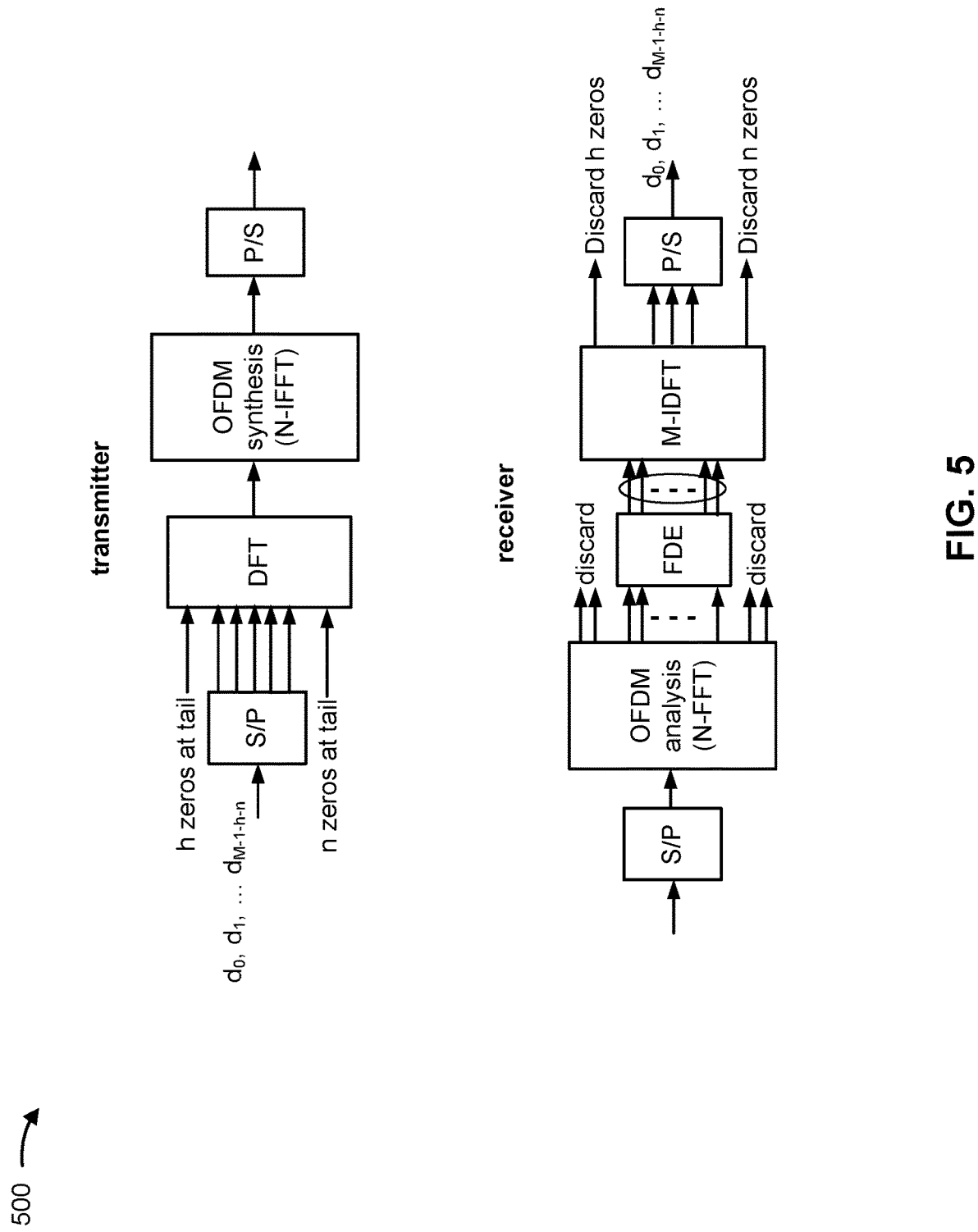
FIG. 5 is a diagram illustrating an example of generating a GI-based waveform, in accordance with the present disclosure.

FIG. 5 is a diagram illustrating an example 500 of generating a GI-based waveform, in accordance with the present disclosure.

An NR network may use large bandwidths for operating in high frequency bands. Several types of waveforms may be used for large bandwidth communications. One type of waveform may include an SC frequency domain waveform, such as a DFT-s-OFDM waveform. SC frequency domain waveforms may have a low peak-to-average power ratio (PAPR) for better coverage and/or efficient bandwidth utilization (no guard band may be necessary). SC time domain waveforms may also have low FFT complexity. On the other hand, OFDM waveforms may have efficient bandwidth utilization but with a higher PAPR and a higher spectral efficiency.

Some communications in these waveforms may use a CP to help eliminate inter-symbol interference. The CP may be a repetition of information from a previous symbol that is used as a guard against inter-symbol interference (ISI).

A GI-based waveform can adapt to different delay spread without changing symbol duration and achieve better resource utilization. The GI-based waveform may be extended to DFT-s-OFDM. Some solutions may produce zero-tail (ZT) DFT-s-OFDM signals by adding zeros prior to DFT input. The resulting communication may include data content and tail samples at the end to help mitigate interference. Example 500 shows components in a transmission chain of a transmitting device. The transmitting device is a wireless communication device such as a base station (e.g., base station 110 depicted in FIGS. 1-2) or a UE (e.g., UE 120 depicted in FIGS. 1-2). The transmitting device may communicate using a wireless link to a receiving device, which is a wireless communication device such as a base station (e.g., base station 110) or a UE (e.g., UE 120). The transmitting device may include an S/P converter, a DFT component that spreads an uplink shared channel, an IFFT component that performs an inverse FFT to prepare the uplink shared channel or output signal for transmission, and a P/S converter. The transmitting device may generate a first communication that includes a GI at a start of the first communication, data content, and tail samples at an end of the first communication. The first communication may be a single symbol of a larger communication or may include multiple symbols.

The transmitting device may concatenate, before a DFT multiplexing operation by the DFT component for the first communication, modulated samples for data content and fill samples. The fill samples may be, for example, random modulated samples, repeated data modulation samples, reference signal samples, or low energy samples (e.g., zeros). In example 500, the fill samples are shown as zeros.

However, a zero-sample GI is not usable for tracking or channel estimation. Due to the oversampling (different DFT and IFFT size), the GIs in the IFFT output are not zero samples anymore, which introduces the imperfection on the circular property for FFT operation.

As indicated above, FIG. 5 is provided as an example. Other examples may differ from what is described with regard to FIG. 5.

Figure 6:
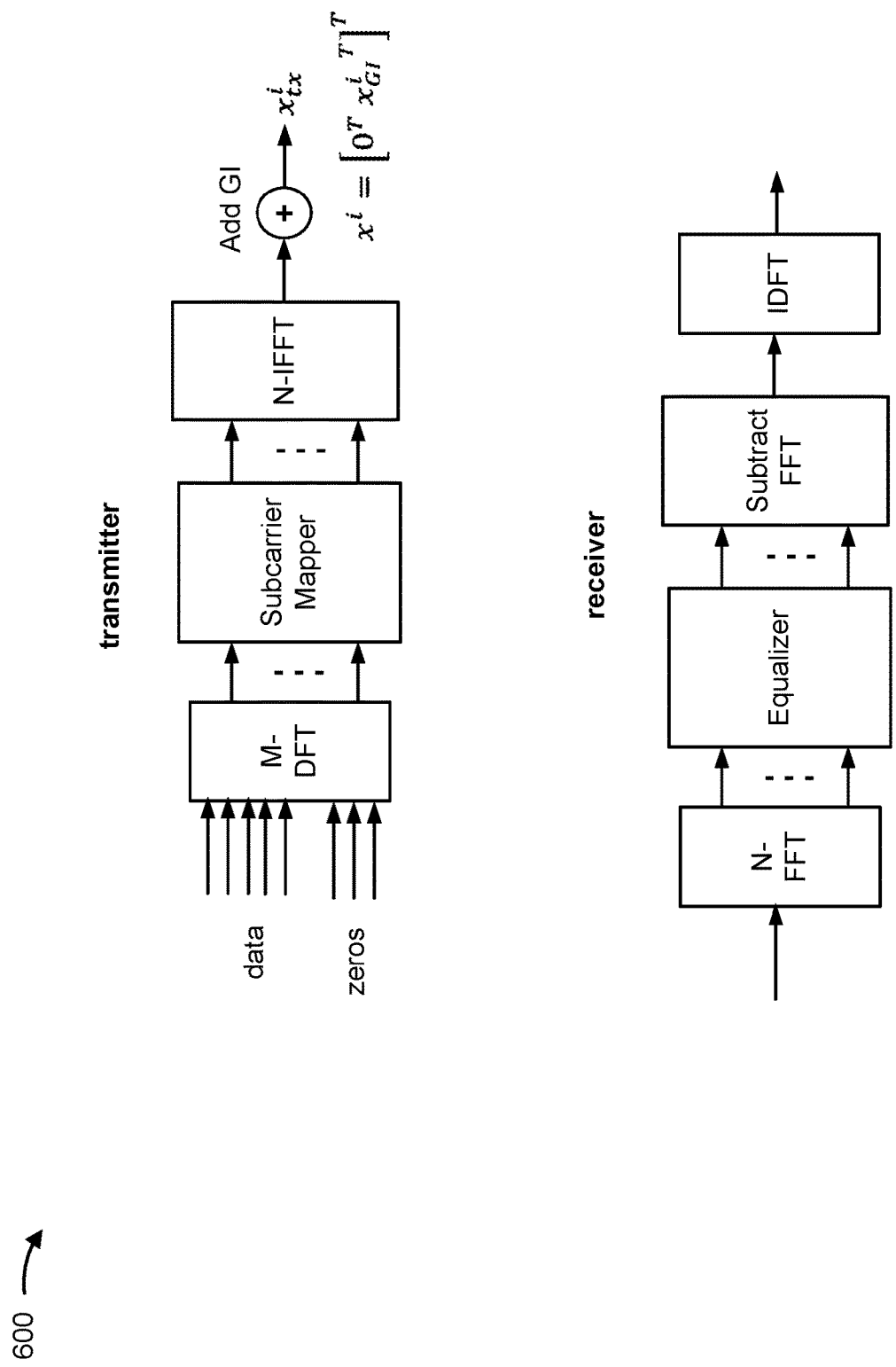
FIG. 6 is a diagram illustrating an example of generating a GI-based waveform, in accordance with the present disclosure.

FIG. 6 is a diagram illustrating an example 600 of generating a GI-based waveform, in accordance with the present disclosure.

Example 600 shows data and zeros that are input into an M-point DFT to help create zero tails for DFT-s-OFDM. The DFT output proceeds through a subcarrier mapper and an N-point IFFT. Example 600 further shows that Zadoff-Chu (ZC) sequences can be added as GI sequences after an IFFT output. The receiver may subtract the impact of any GI sequences. While known signals may be used for GI sequences, to achieve flexible adaptation to delay spread and to enable tracking, such GIs still suffer from the imperfection on the circular property for FFT operation. The GI sequences may only be utilized in the IFFT domain. That is, the receiver may have to perform FFT, equalization, and then return to IFFT. These additional computations may consume processing resources.

As indicated above, FIG. 6 is provided as an example. Other examples may differ from what is described with regard to FIG. 6.

Figure 7:
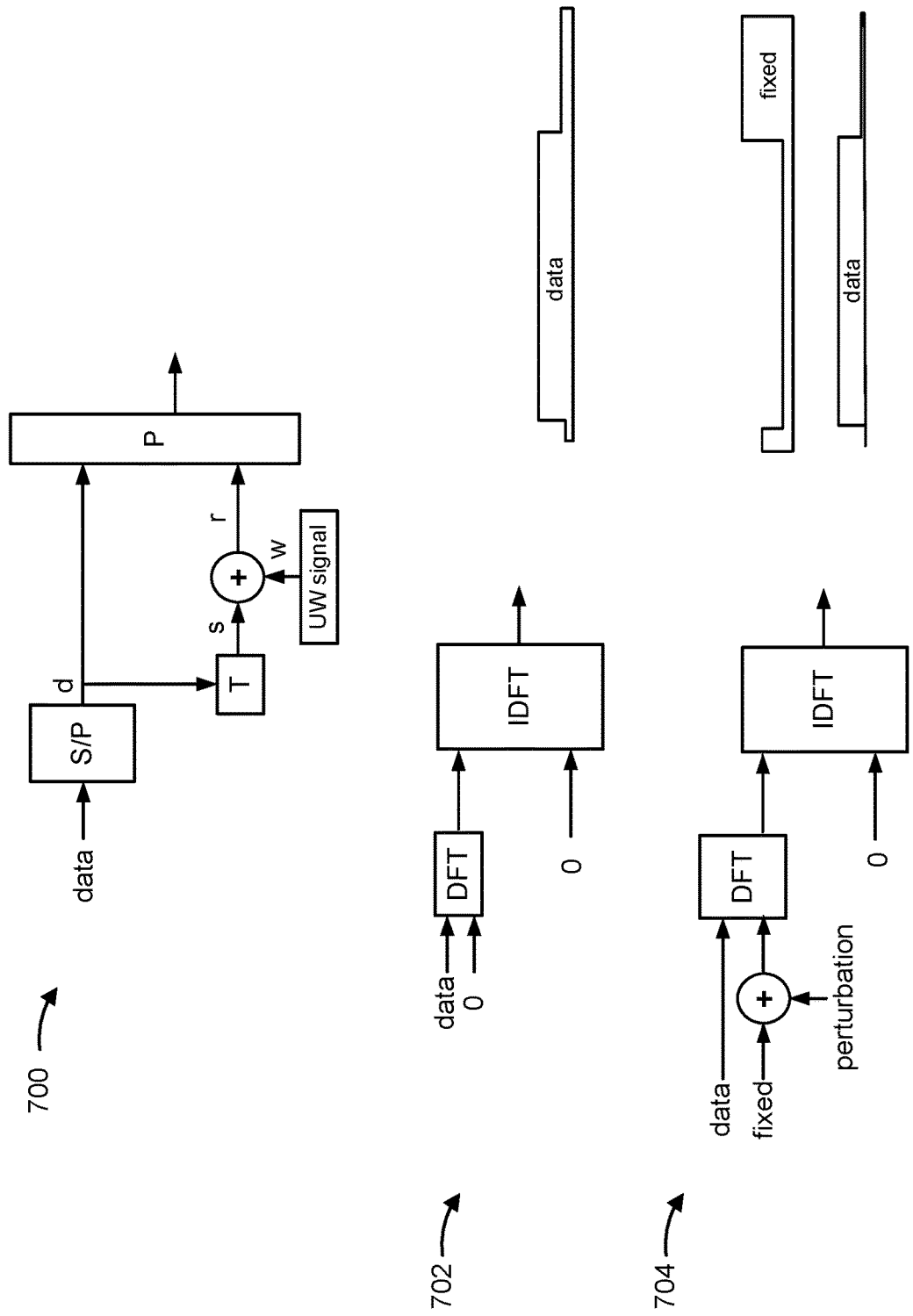
FIG. 7 is a diagram illustrating examples of generating a GI-based waveform, in accordance with the present disclosure.

FIG. 7 is a diagram illustrating examples 700, 702, and 704 of generating a GI-based waveform, in accordance with the present disclosure.

Example 700 shows data and non-zero redundant symbols (function of the data symbols) that are introduced prior to DFT to suppress tail energy that leaks from oversampling. The GI sequences (w) are added prior to the DFT so that there is no need for GI cancellation. This approach tries to achieve a perfect circular property. However, the GI sequences input to the DFT are superimposed with the data input and thus the receiver has to perform FFT, tone extraction, equalization, and IFFT. These additional computations may consume processing resources of the transmitter. Example 702 shows how data and zeroes introduced to the DFT may create a tail that is somewhat suppressed, to cause less interference. Example 704 shows perturbation of fixed data that is introduced with the data to the DFT to further suppress the tail.

As indicated above, FIG. 7 provides some examples. Other examples may differ from what is described with regard to FIG. 7.

Figure 8:
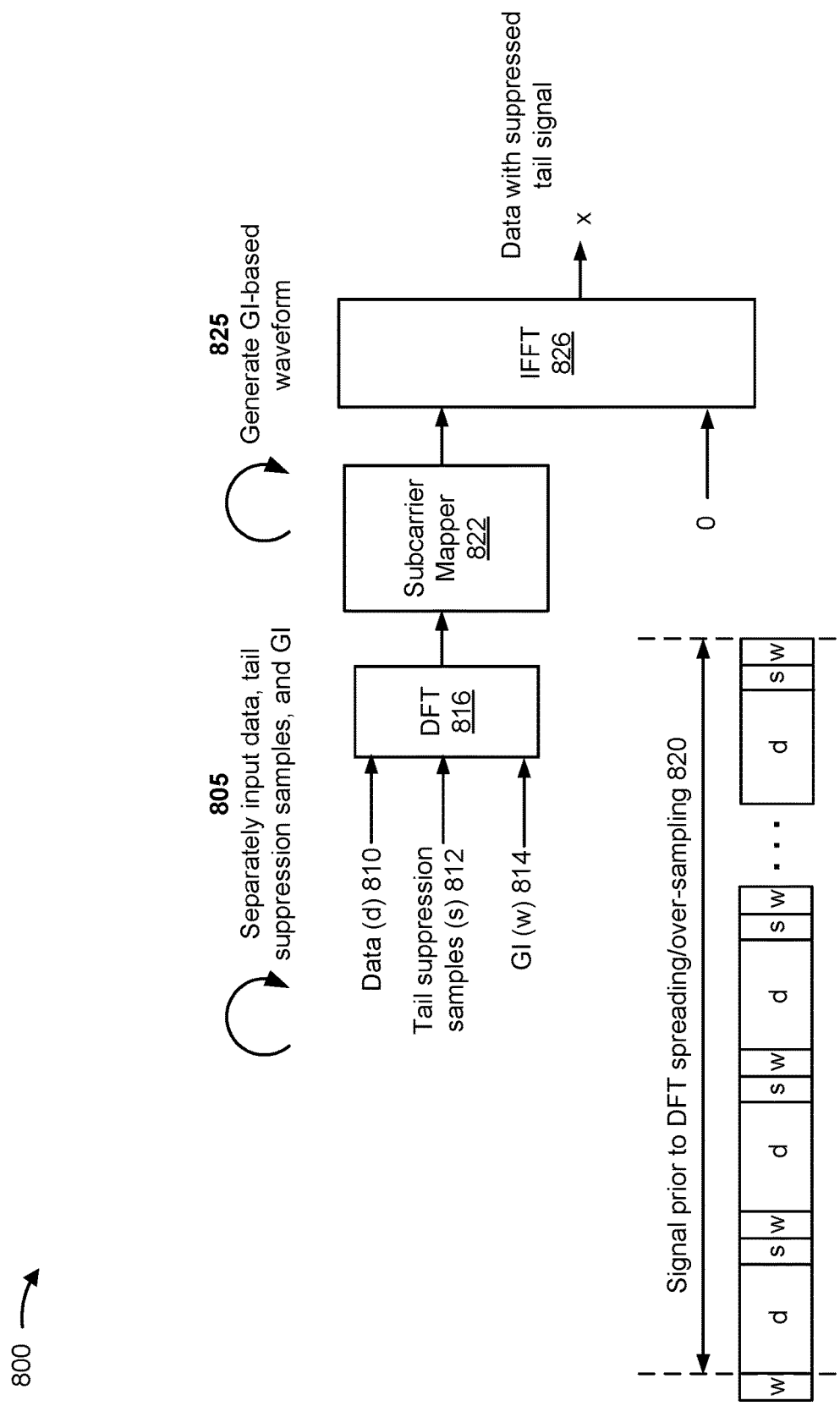
FIG. 8 is a diagram illustrating an example of generating a GI-based waveform with a suppressed tail, in accordance with the present disclosure.

FIG. 8 is a diagram illustrating an example 800 of generating a GI-based waveform with a suppressed tail, in accordance with the present disclosure.

According to various aspects described herein, rather than superimposing a GI sequence with data as DFT input or superimposing the GI sequence with fixed tail symbols, a transmitter (e.g., UE 120, base station 110) may, as shown by reference number 805, separately input the data (d) 810, tail suppression samples (s) 812, and the GI sequence (w) 814 into DFT component 816. Input signal 820 shows how the data (d), the tail suppression samples (s) and the GI sequence (w) have separate resource elements (REs) in the time domain. The output of the DFT component 816 may then be mapped to subcarriers by subcarrier mapper 822. As shown by reference number 825, the transmitter may then generate a GI-based waveform using IFFT component 826. The resultant signal x will include data with a tail that is suppressed by a tail suppression signal. Since the tail suppression signal is a known function of the transmitted modulations, the suppressed tail signal can be used as additional redundancy for signal detection. Furthermore, the known GI sequence does not rely on a transmitted modulation and thus can be used for tracking and/or phase noise compensation.

The GI-based waveform may be generated by performing calculations for an IFFT operation. For example, a value A may represent the IFFT operation ($F^H$) to be performed with DFT matrix D, shown by $$\begin{bmatrix} d \\ s \\ w \end{bmatrix},$$

with separate inputs for data (d), tail suppression samples (s), and a GI sequence (w). A may be equal to $F^H$ B D, where matrix B represents subcarrier mapping. The IFFT output x may be found by:

$$x = A \begin{bmatrix} d \\ s \\ w \end{bmatrix} = \begin{bmatrix} M_{11} & M_{12} & M_{13} \\ M_{21} & M_{22} & M_{23} \end{bmatrix} \begin{bmatrix} d \\ s \\ w \end{bmatrix} = \begin{bmatrix} x_{non\text{-}tail} \\ x_{tail} \end{bmatrix}$$

To reduce data leakage to the GI sequence, the UE 120 may select a value for the tail suppression samples s, such that $M_{22}s+M_{21}d=0$. For example, the UE 120 may use $s=-M_{22}^{-1}\cdot M_{21}\cdot d$. That is, the UE 120 may select the tail suppression samples s to have a negative value that is based at least in part on a product of an inverse of a second tail matrix component ($M_{22}$), a first tail matrix component ($M_{21}$), and a value of d. The UE 120 may select the value of s for each symbol. The UE 120 may not need to completely remove the impact from d to x_tail. As long as $M_{22}s+M_{21}d$ is substantially smaller than $M_{23}$ w, the UE 120 may be considered to have maintained the cyclic structure. This enables the UE 120 to have more flexibility in selecting s and may reduce the length of s.

In some aspects, the UE 120 may select a quantity of the tail suppression samples s based at least in part on a size of the data content d. In some aspects, the UE 120 may select a type (e.g., zero, non-zero, fix low-energy input, function of data symbols) of the tail suppression samples s based at least in part on the data content d. The UE 120 may select the value of the tail suppression samples s based at least in part on an interference requirement (e.g., target inter-symbol interference) and/or based at least in part on an MCS.

At the receiver (e.g., base station 110, UE 120), after FFT, the base station 110 may extract each UE signal and perform equalization and inverse DFT (IDFT) to the time domain. The base station 110 may use known GI sequences for tracking and phase noise compensation. The base station 110 may use the value of s for signal detection to minimize the overhead.

In some aspects, the UE 120 may generate a resultant communication for SC-FDE (e.g., with up-sampling). This involves an equalization operation at the receiver. The base station 110 may indicate, to the UE 120, the allocated time domain REs for the tail suppression samples s. For a lower MCS or a lower operating point, the tail suppression signal may not be needed. For a medium MCS or a medium operating point, the UE 120 may transmit a partial tail suppression signal with fewer time domain REs. For a higher MCS or a higher operating point, the UE 120 may transmit a tail suppression signal with a greater quantity of time domain REs. In some aspects, the UE 120 may select the tail suppression samples to better support a circular property for DMRS symbols than for other data symbols. The base station 110 may also indicate whether the time domain REs for the tail suppression signal can (partially) overlap with the GI signal. The UE 120 may indicate whether the UE 120 supports tail suppression signal generation or reception.

By separately inputting data, tail suppression samples, and a GI sequence into the DFT, the UE 120 (or another device acting as a transmitter) may suppress leakage from the data to GI sequences that can be used for tracking and phase noise compensation. Complexity may also be reduced at the receiver. This may cause the UE 120 and the base station 110 to conserve processing resources and signaling resources. While generation of the GI-based waveform is described for UE 120, the base station 110 may also generate the GI-based waveform as described in connection with FIG. 8.

As indicated above, FIG. 8 is provided as an example. Other examples may differ from what is described with regard to FIG. 8.

Figure 9:
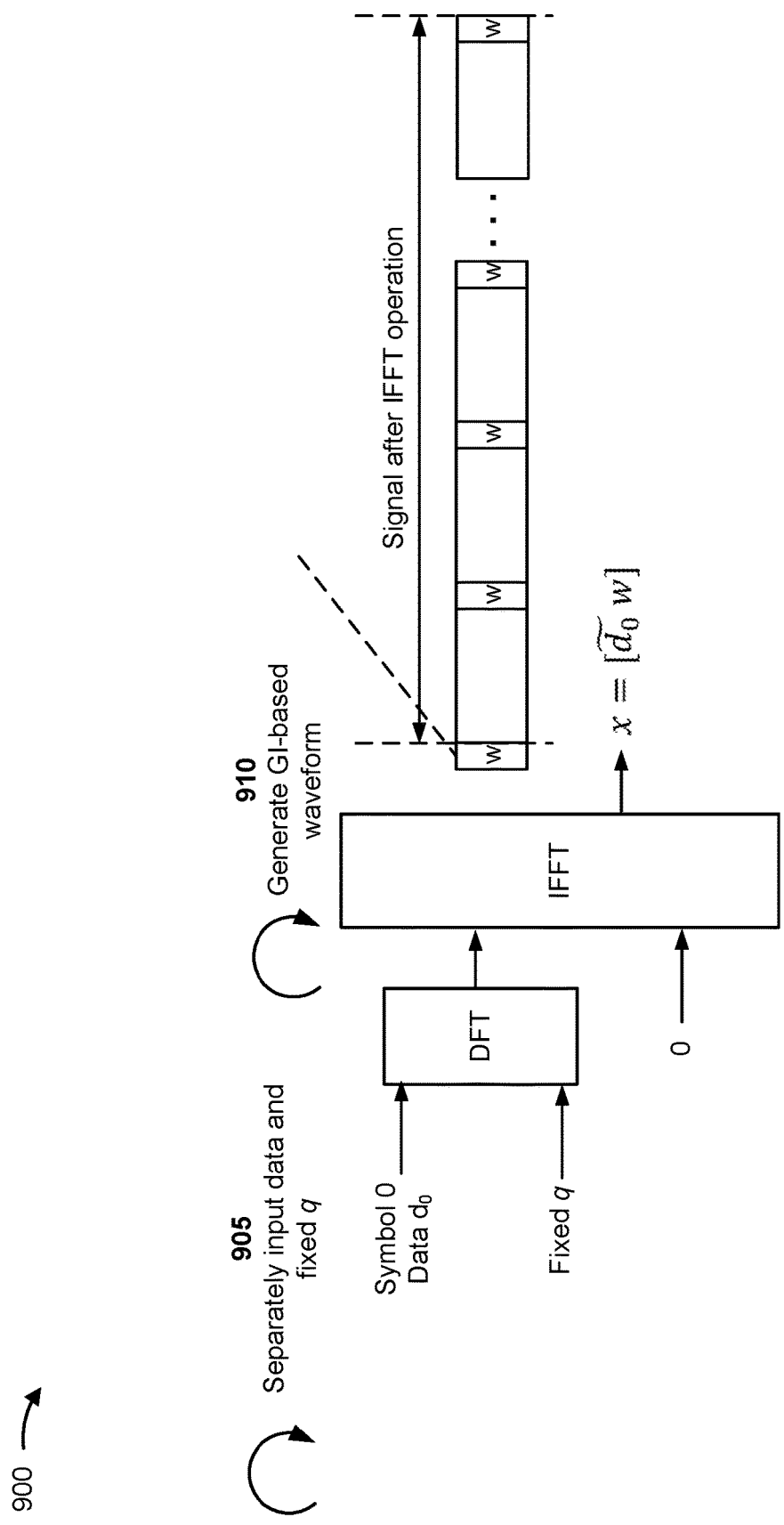
FIG. 9 is a diagram illustrating another example of generating a GI-based waveform, in accordance with the present disclosure.

FIG. 9 is a diagram illustrating another example 900 of generating a GI-based waveform, in accordance with the present disclosure.

In some aspects, if the UE 120 (or another transmitter such as the base station 110) is to reduce computation of a tail suppression signal (and the receiver is to compute the tail suppression signal), the UE 120 may generate a GI-based waveform for ZT-DFT-s-OFDM or unique word (UW)-DFT-s-OFDM, which do not use a tail suppression signal. However, such a waveform may introduce ISI, as the oversampled signal in the time domain for FFT/IFFT is no longer circular.

According to various aspects described herein, the UE 120 may copy a tail part of a symbol of IFFT output (such as a CP) and reuse the same CP for the rest of the symbols to ensure a circular property. The CP may become the GI for other symbols and may be post-IFFT. In some aspects, the UE 120 may introduce some windowing when inserting the samples, to smooth out the transition.

Similar to the calculations described in connection with example 800, the IFFT output x may become:

$$x = A\begin{bmatrix}d\\q\end{bmatrix} = \begin{bmatrix}M_{11} & M_{12}\\M_{21} & M_{22}\end{bmatrix}\begin{bmatrix}d\\q\end{bmatrix} = \begin{bmatrix}x_{non\text{-}tail}\\w\end{bmatrix},$$

where $w=M_{21}$ d+$M_{22}$ q. Since w is included in the IDFT operation, w can introduce signal distortion to other data symbols. If signal distortion happens to be introduced to the other data symbols, the UE 120 may copy the CP of a DMRS symbol and reuse the CP for the rest of the data symbols. In this way, there is little or no impact on the DMRS symbol. In addition, the UE 120 may generate a GI waveform based at least in part on the DMRS symbol.

Example 900 shows reuse of a CP of one symbol for the rest of the symbols. As shown by reference number 905, the UE 120 may separately input the data (for symbol 0, or $d_0$) and fixed samples q. As shown by reference 910, the UE 120 may generate a GI-based waveform with an output x=[$d_0$ w], where w is copied for multiple symbols. If do is a DMRS symbol, then the UE 120 may generate a known w for better utilization. While copying of the CP is described for UE 120, the base station 110 may also copy the CP to other symbols as described in connection with FIG. 9.

As indicated above, FIG. 9 is provided as an example. Other examples may differ from what is described with regard to FIG. 9.

Figure 10:
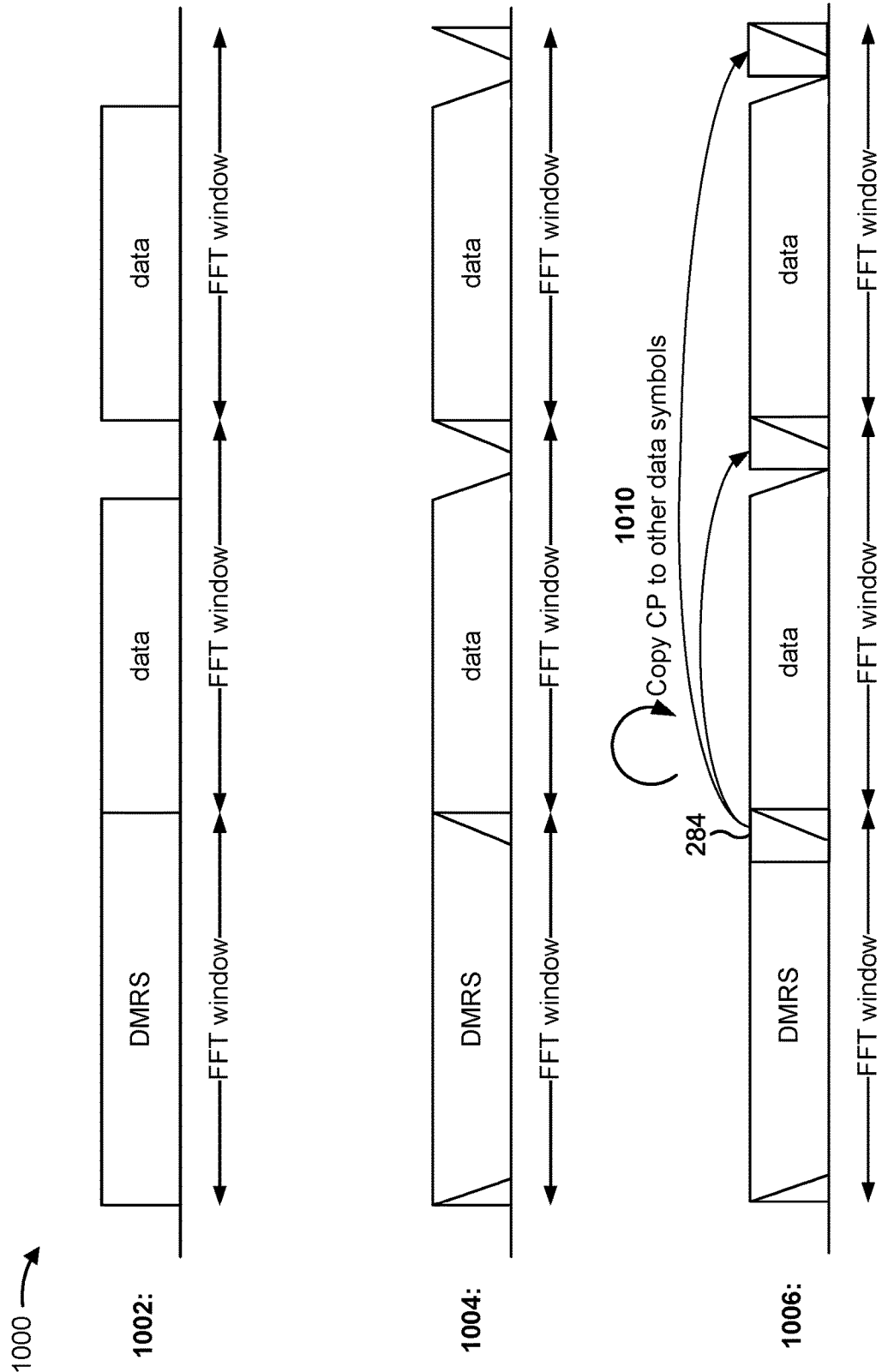
FIG. 10 is a diagram illustrating an example of reusing a CP, in accordance with the present disclosure.

FIG. 10 is a diagram illustrating an example 1000 of reusing a CP, in accordance with the present disclosure.

Example 1000 shows DMRS and data symbols for FFT windows. Symbol series 1002 shows that there may be a gap between data symbols. Symbol series 1004 shows grace periods that are added between DMRS and data symbols. Symbol series 1006 shows that a transmitter (e.g., UE 120) may generate a CP (e.g., output x from IFFT). The UE 120 may generate the CP from a DMRS symbol. As shown by reference number 1010, the UE 120 may copy the CP to other data symbols. This may be effectively zero-padding the ends of the data symbols. Note that for symbol series 1006, half of the grace period may be punctured.

As indicated above, FIG. 10 is provided as an example. Other examples may differ from what is described with regard to FIG. 10.

Figure 11:
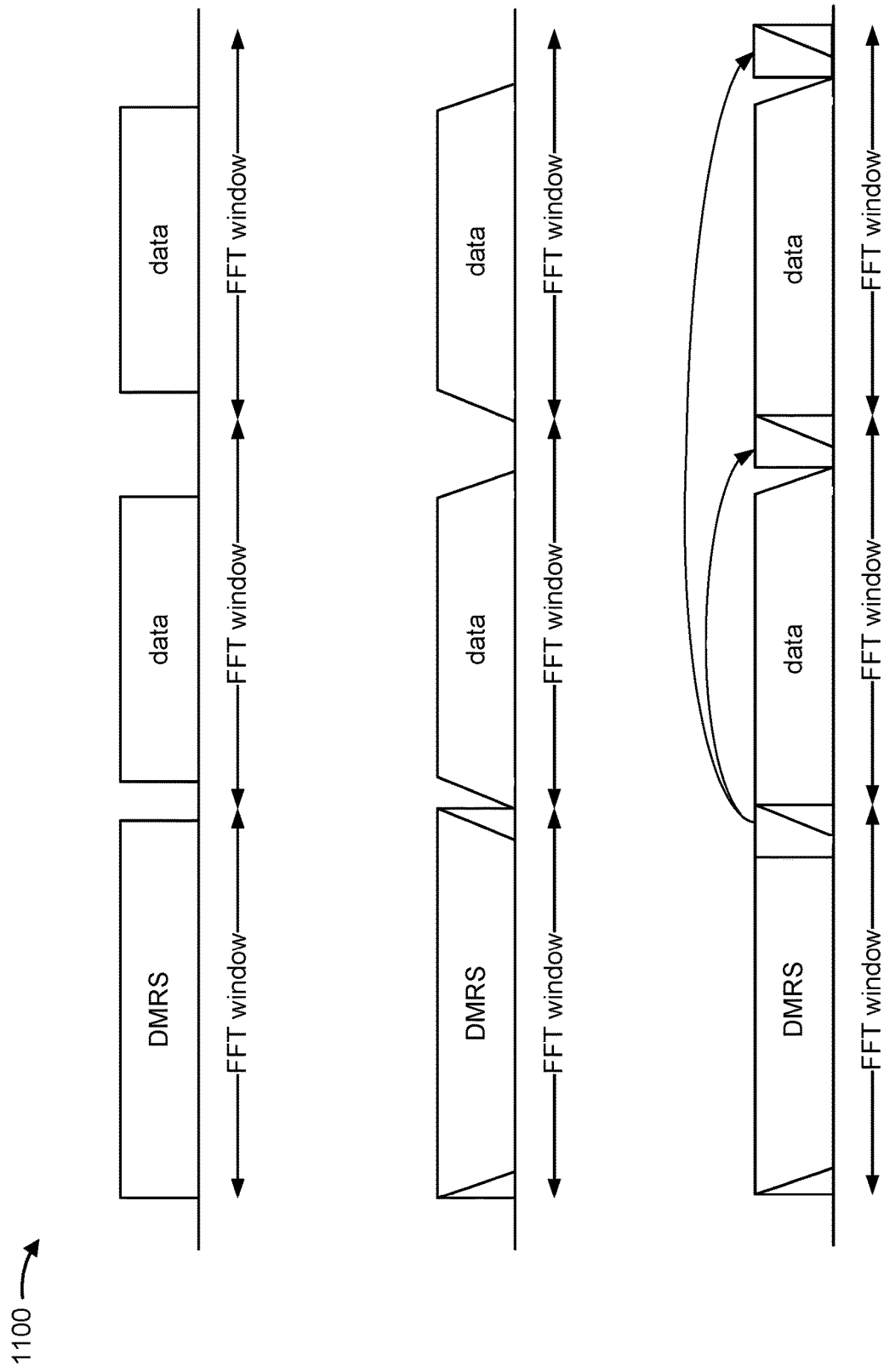
FIG. 11 is a diagram illustrating an example of zero padding, in accordance with the present disclosure.

FIG. 11 is a diagram illustrating an example 1100 of zero padding, in accordance with the present disclosure.

In some aspects, the transmitter (e.g., UE 120, base station 110) may further zero pad both a beginning and an end of data symbols to further protect the data symbols. Example 1100 shows a zero-tail that is added to both ends of the symbols.

As indicated above, FIG. 11 is provided as an example. Other examples may differ from what is described with regard to FIG. 11.

Figure 12:
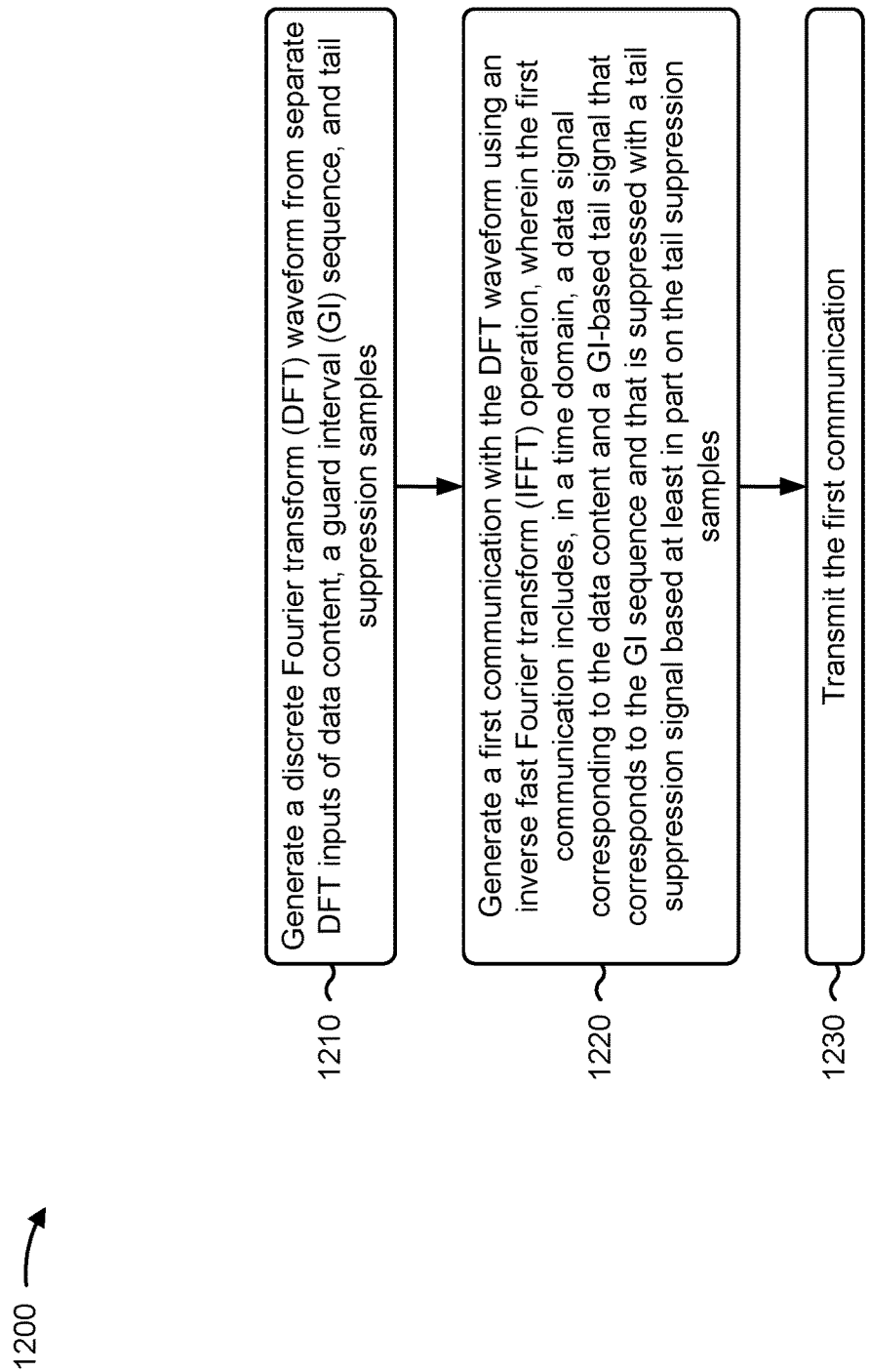
FIG. 12 is a diagram illustrating an example process performed, for example, by a UE or a base station, in accordance with the present disclosure.

FIG. 12 is a diagram illustrating an example process 1200 performed, for example, by a UE or a base station, in accordance with the present disclosure. Example process 1200 is an example where the UE (e.g., UE 120) or the base station (e.g., base station 110) performs operations associated with generating GI-based waveforms.

As shown in FIG. 12, in some aspects, process 1200 may include generating a DFT waveform from separate DFT inputs of data content, a GI sequence, and tail suppression samples (block 1210). For example, the UE (e.g., using communication manager 140 and/or generation component 1508 depicted in FIG. 15) or the base station (e.g., using communication manager 150 and/or generation component 1808 depicted in FIG. 18) may generate a DFT waveform from separate DFT inputs of data content, a GI sequence, and tail suppression samples, as described above.

As further shown in FIG. 12, in some aspects, process 1200 may include generating a first communication with the DFT waveform using an IFFT operation, wherein the first communication includes, in a time domain, a data signal corresponding to the data content and a GI-based tail signal that corresponds to the GI sequence and that is suppressed with a tail suppression signal based at least in part on the tail suppression samples (block 1220). For example, the UE (e.g., using communication manager 140 and/or generation component 1508 depicted in FIG. 15) or the base station (e.g., using communication manager 150 and/or generation component 1808 depicted in FIG. 18) may generate a first communication with the DFT waveform using an IFFT operation, wherein the first communication includes, in a time domain, a data signal corresponding to the data content and a GI-based tail signal that corresponds to the GI sequence and that is suppressed with a tail suppression signal based at least in part on the tail suppression samples, as described above.

As further shown in FIG. 12, in some aspects, process 1200 may include transmitting the first communication (block 1230). For example, the UE (e.g., using communication manager 140 and/or transmission component 1504 depicted in FIG. 15) or the base station (e.g., using communication manager 150 and/or generation component 1808 depicted in FIG. 18) may transmit the first communication, as described above.

Process 1200 may include additional aspects, such as any single aspect or any combination of aspects described below and/or in connection with one or more other processes described elsewhere herein.

In a first aspect, process 1200 includes selecting the tail suppression samples to reduce data leakage from the GI-based tail signal.

In a second aspect, alone or in combination with the first aspect, process 1200 includes selecting a quantity of the tail suppression samples based at least in part on a size of the data content.

In a third aspect, alone or in combination with one or more of the first and second aspects, process 1200 includes selecting a type of the tail suppression samples based at least in part on the data content.

In a fourth aspect, alone or in combination with one or more of the first through third aspects, process 1200 includes selecting the tail suppression samples to have a negative value that is based at least in part on a product of an inverse of a second tail matrix component, a first tail matrix component, and a value of the data content.

In a fifth aspect, alone or in combination with one or more of the first through fourth aspects, process 1200 includes selecting a quantity of the tail suppression samples based at least in part on an MCS for the data content.

In a sixth aspect, alone or in combination with one or more of the first through fifth aspects, process 1200 includes selecting a quantity of the tail suppression samples based at least in part on a circular property for DMRSs.

In a seventh aspect, alone or in combination with one or more of the first through sixth aspects, generating the first communication includes generating the first communication for SC-FDE with up-sampling.

In an eighth aspect, alone or in combination with one or more of the first through seventh aspects, process 1200 includes partially overlapping the GI-based tail signal and the tail suppression signal according to a received indication.

In a ninth aspect, alone or in combination with one or more of the first through eighth aspects, process 1200 includes transmitting an indication of a UE capability for suppression signal generation or reception.

In a tenth aspect, alone or in combination with one or more of the first through ninth aspects, transmitting the first communication includes transmitting the first communication in a first symbol, and process 1200 includes transmitting a second communication in a second symbol using a copy of a tail signal used for the first communication as a GI for a data signal of the second communication.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
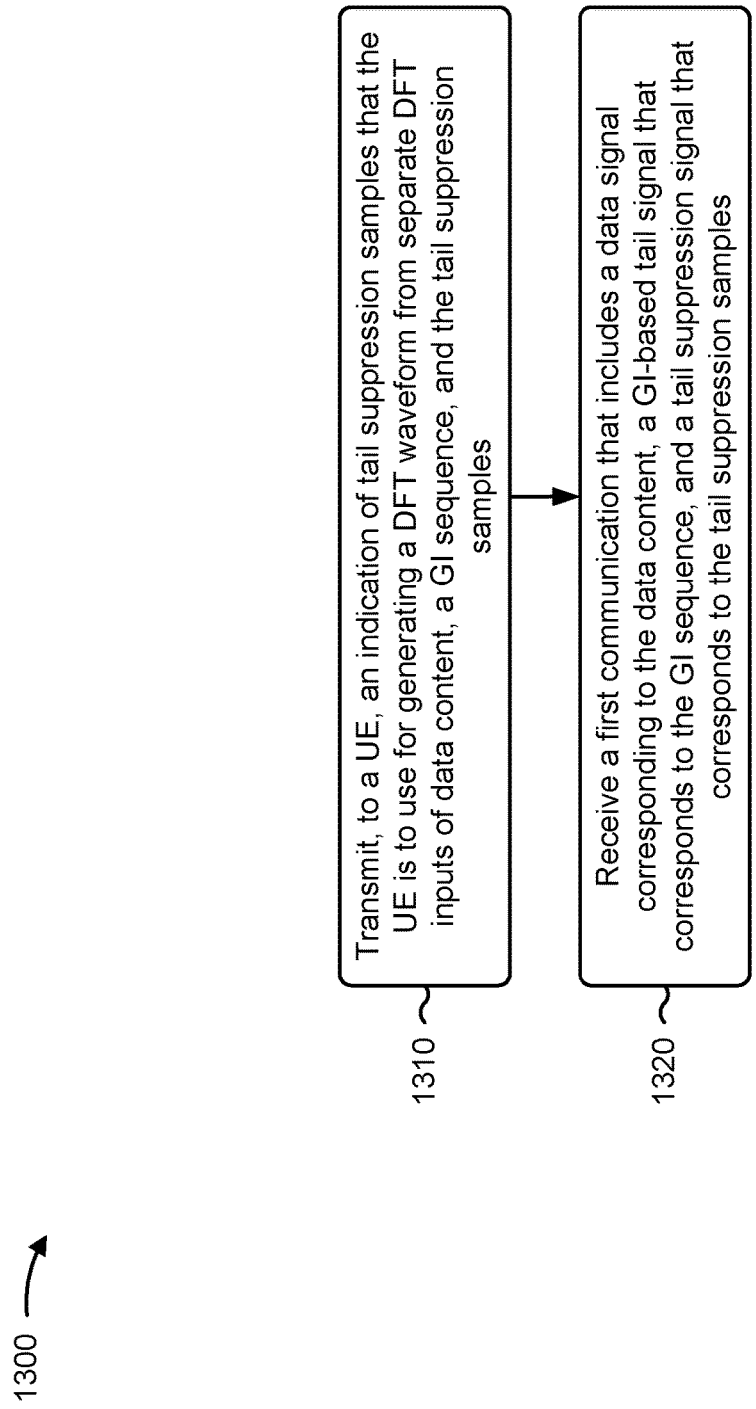
FIG. 13 is a diagram illustrating an example process performed, for example, by a base station, in accordance with the present disclosure.

FIG. 13 is a diagram illustrating an example process 1300 performed, for example, by a base station, in accordance with the present disclosure. Example process 1300 is an example where the base station (e.g., base station 110) performs operations associated with using GI-based waveforms.

As shown in FIG. 13, in some aspects, process 1300 may include transmitting, to a UE, an indication of tail suppression samples that the UE is to use for generating a DFT waveform from separate DFT inputs of data content, a GI sequence, and the tail suppression samples (block 1310). For example, the base station (e.g., using communication manager 150 and/or transmission component 1604 depicted in FIG. 16) may transmit, to a UE, an indication of tail suppression samples that the UE is to use for generating a DFT waveform from separate DFT inputs of data content, a GI sequence, and the tail suppression samples, as described above.

As further shown in FIG. 13, in some aspects, process 1300 may include receiving a first communication that includes a data signal corresponding to the data content, a GI-based tail signal that corresponds to the GI sequence, and a tail suppression signal that corresponds to the tail suppression samples (block 1320). For example, the base station (e.g., using communication manager 150 and/or reception component 1602 depicted in FIG. 16) may receive a first communication that includes a data signal corresponding to the data content, a GI-based tail signal that corresponds to the GI sequence, and a tail suppression signal that corresponds to the tail suppression samples, as described above.

Process 1300 may include additional aspects, such as any single aspect or any combination of aspects described below and/or in connection with one or more other processes described elsewhere herein.

In a first aspect, process 1300 includes selecting the tail suppression samples based at least in part on an MCS for the data content.

In a second aspect, alone or in combination with the first aspect, process 1300 includes selecting the tail suppression samples based at least in part on a circular property for DMRSs.

In a third aspect, alone or in combination with one or more of the first and second aspects, process 1300 includes performing SC-FDE with up-sampling to decode the first communication.

In a fourth aspect, alone or in combination with one or more of the first through third aspects, the indication indicates whether the GI-based tail signal and the tail suppression signal are to partially overlap.

In a fifth aspect, alone or in combination with one or more of the first through fourth aspects, process 1300 includes receiving an indication of a UE capability for suppression signal generation or reception, and process 1300 includes selecting the tail suppression samples based at least in part on the UE capability.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
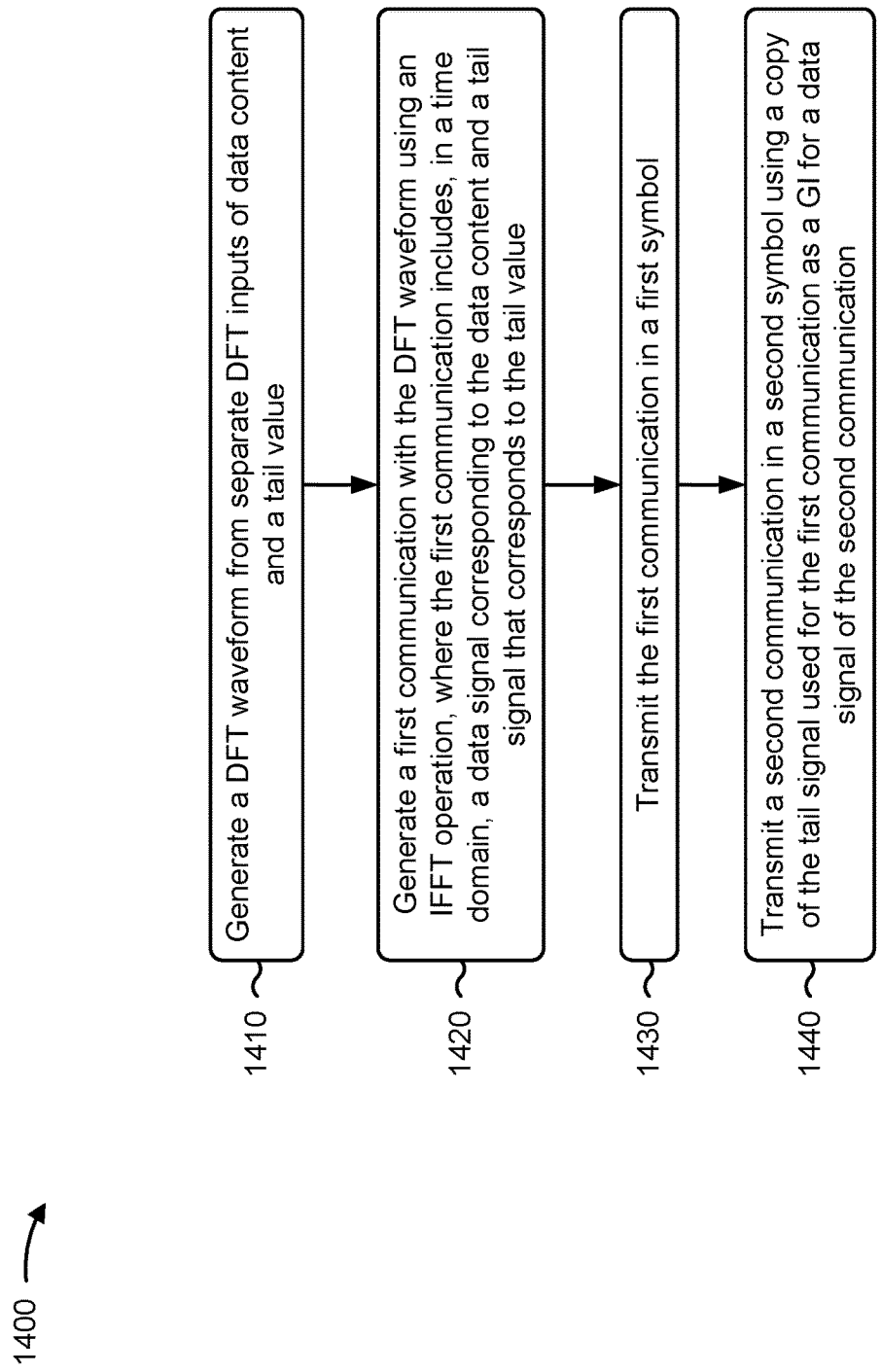
FIG. 14 is a diagram illustrating an example process performed, for example, by a UE, in accordance with the present disclosure.

FIG. 14 is a diagram illustrating an example process 1400 performed, for example, by a UE, in accordance with the present disclosure. Example process 1400 is an example where the UE (e.g., UE 120) performs operations associated with generating GI-based waveforms.

As shown in FIG. 14, in some aspects, process 1400 may include generating a DFT waveform from separate DFT inputs of data content and a tail value (block 1410). For example, the UE (e.g., using communication manager 140 and/or generation component 1708 depicted in FIG. 17) may generate a DFT waveform from separate DFT inputs of data content and a tail value, as described above.

As further shown in FIG. 14, in some aspects, process 1400 may include generating a first communication with the DFT waveform using an IFFT operation, wherein the first communication includes, in a time domain, a data signal corresponding to the data content and a tail signal that corresponds to the tail value (block 1420). For example, the UE (e.g., using communication manager 140 and/or generation component 1708 depicted in FIG. 17) may generate a first communication with the DFT waveform using an IFFT operation, wherein the first communication includes, in a time domain, a data signal corresponding to the data content and a tail signal that corresponds to the tail value, as described above.

As further shown in FIG. 14, in some aspects, process 1400 may include transmitting the first communication in a first symbol (block 1430). For example, the UE (e.g., using communication manager 140 and/or transmission component 1704 depicted in FIG. 17) may transmit the first communication in a first symbol, as described above.

As further shown in FIG. 14, in some aspects, process 1400 may include transmitting a second communication in a second symbol using a copy of the tail signal used for the first communication as a GI for a data signal of the second communication (block 1440). For example, the UE (e.g., using communication manager 140 and/or transmission component 1704 depicted in FIG. 17) may transmit a second communication in a second symbol using a copy of the tail signal used for the first communication as a GI for a data signal of the second communication, as described above.

Process 1400 may include additional aspects, such as any single aspect or any combination of aspects described below and/or in connection with one or more other processes described elsewhere herein.

In a first aspect, the GI is a cyclic prefix.

In a second aspect, alone or in combination with the first aspect, the first symbol is a DMRS.

In a third aspect, alone or in combination with one or more of the first and second aspects, process 1400 includes zero padding one or more of a first end or a second end of the data signal of the second communication.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
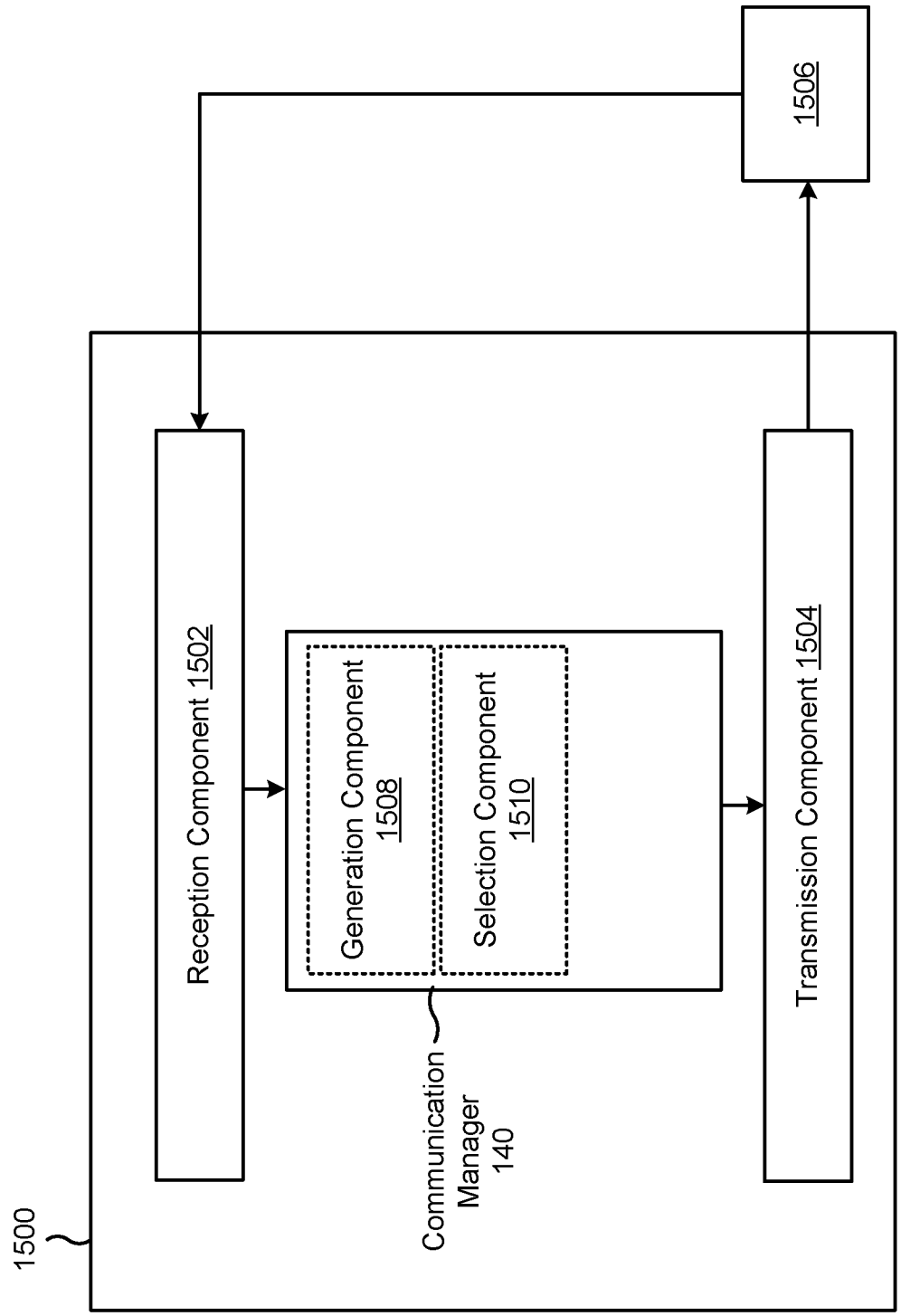
FIGS. 15-18 are diagrams of example apparatuses for wireless communication, in accordance with the present disclosure.

FIG. 15 is a diagram of an example apparatus 1500 for wireless communication. The apparatus 1500 may be a UE (e.g., UE 120), or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include a generation component 1508 and/or a selection component 1510, among other examples.

In some aspects, the apparatus 1500 may be configured to perform one or more operations described herein in connection with FIGS. 1-11. Additionally, or alternatively, the apparatus 1500 may be configured to perform one or more processes described herein, such as process 1200 of FIG. 12. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The generation component 1508 may generate a DFT waveform from separate DFT inputs of data content, a GI sequence, and tail suppression samples. The generation component 1508 may generate a first communication with the DFT waveform using an IFFT operation. The first communication may include, in a time domain, a data signal corresponding to the data content and a GI-based tail signal that corresponds to the GI sequence and that is suppressed with a tail suppression signal based at least in part on the tail suppression samples. The transmission component 1504 may transmit the first communication.

The selection component 1510 may select the tail suppression samples to reduce data leakage from the GI-based tail signal. The selection component 1510 may select a quantity of the tail suppression samples based at least in part on a size of the data content. The selection component 1510 may select a type of the tail suppression samples based at least in part on the data content. The selection component 1510 may select the tail suppression samples to have a negative value that is based at least in part on a product of an inverse of a second tail matrix component, a first tail matrix component, and a value of the data content. The selection component 1510 may select a quantity of the tail suppression samples based at least in part on an MCS for the data content.

The selection component 1510 may select a quantity of the tail suppression samples based at least in part on a circular property for DMRSs. The generation component 1508 may partially overlap the GI-based tail signal and the tail suppression signal according to a received indication. The transmission component 1504 may transmit an indication of a UE capability for suppression signal generation or reception.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
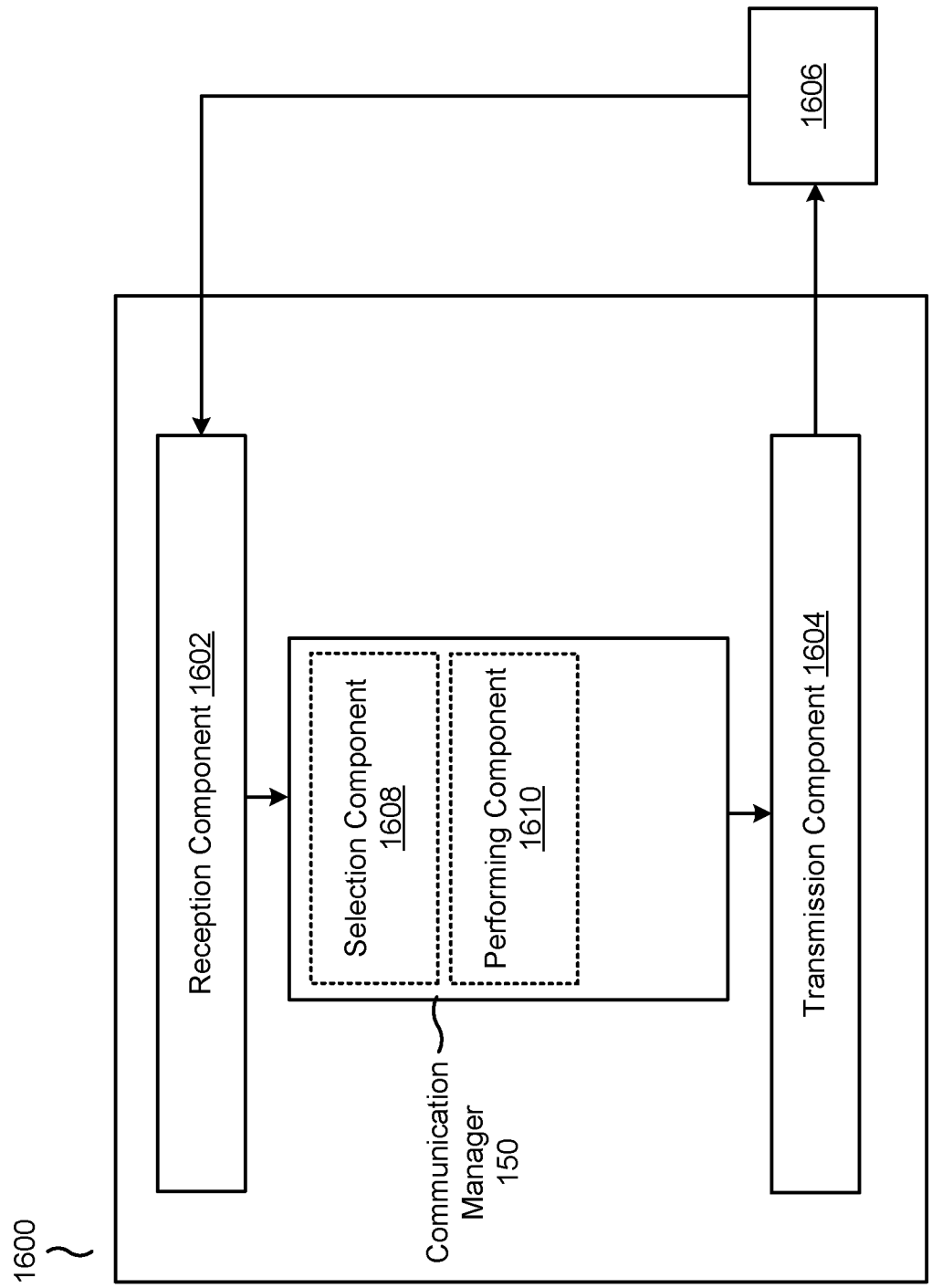

FIG. 16 is a diagram of an example apparatus 1600 for wireless communication. The apparatus 1600 may be a base station (e.g., base station 110), or a base station may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 150. The communication manager 150 may include a selection component 1608 and/or a performing component 1610, among other examples.

In some aspects, the apparatus 1600 may be configured to perform one or more operations described herein in connection with FIGS. 1-11. Additionally, or alternatively, the apparatus 1600 may be configured to perform one or more processes described herein, such as process 1300 of FIG. 13. In some aspects, the apparatus 1600 and/or one or more components shown in FIG. 16 may include one or more components of the base station described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the base station described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the base station described in connection with FIG. 2. In some aspects, the transmission component 1604 may be co-located with the reception component 1602 in a transceiver.

The transmission component 1604 may transmit, to a UE, an indication of tail suppression samples that the UE is to use for generating a DFT waveform from separate DFT inputs of data content, a GI sequence, and the tail suppression samples. The reception component 1602 may receive a first communication that includes a data signal corresponding to the data content, a GI-based tail signal that corresponds to the GI sequence, and a tail suppression signal that corresponds to the tail suppression samples.

The selection component 1608 may select the tail suppression samples based at least in part on an MCS for the data content. The selection component 1608 may select the tail suppression samples based at least in part on a circular property for DMRSs. The performing component 1610 may perform single-carrier frequency domain equalization with up-sampling to decode the first communication.

The reception component 1602 may receive an indication of a UE capability for suppression signal generation or reception, and the selection component 1608 may select the tail suppression samples based at least in part on the UE capability.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
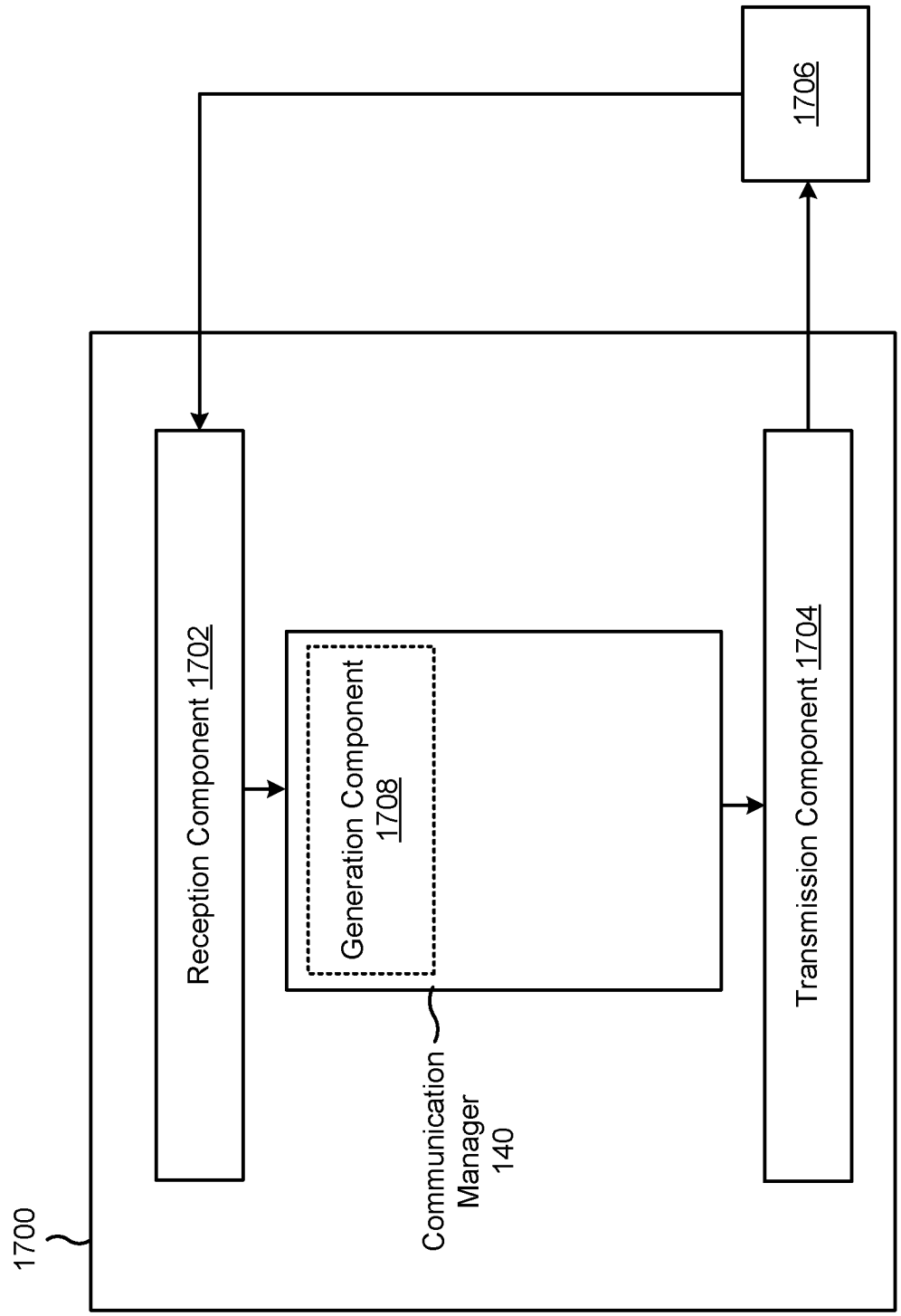

FIG. 17 is a diagram of an example apparatus 1700 for wireless communication. The apparatus 1700 may be a UE (e.g., UE 120), or a UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 140. The communication manager 140 may include a generation component 1708, among other examples.

In some aspects, the apparatus 1700 may be configured to perform one or more operations described herein in connection with FIGS. 1-11. Additionally, or alternatively, the apparatus 1700 may be configured to perform one or more processes described herein, such as process 1400 of FIG. 14. In some aspects, the apparatus 1700 and/or one or more components shown in FIG. 17 may include one or more components of the UE described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the UE described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the UE described in connection with FIG. 2. In some aspects, the transmission component 1704 may be co-located with the reception component 1702 in a transceiver.

The generation component 1708 may generate a DFT waveform from separate DFT inputs of data content and a tail value. The generation component 1708 may generate a first communication with the DFT waveform using an IFFT operation, wherein the first communication includes, in a time domain, a data signal corresponding to the data content and a tail signal that corresponds to the tail value. The transmission component 1704 may transmit the first communication in a first symbol. The transmission component 1704 may transmit a second communication in a second symbol using a copy of the tail signal used for the first communication as a GI for a data signal of the second communication.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
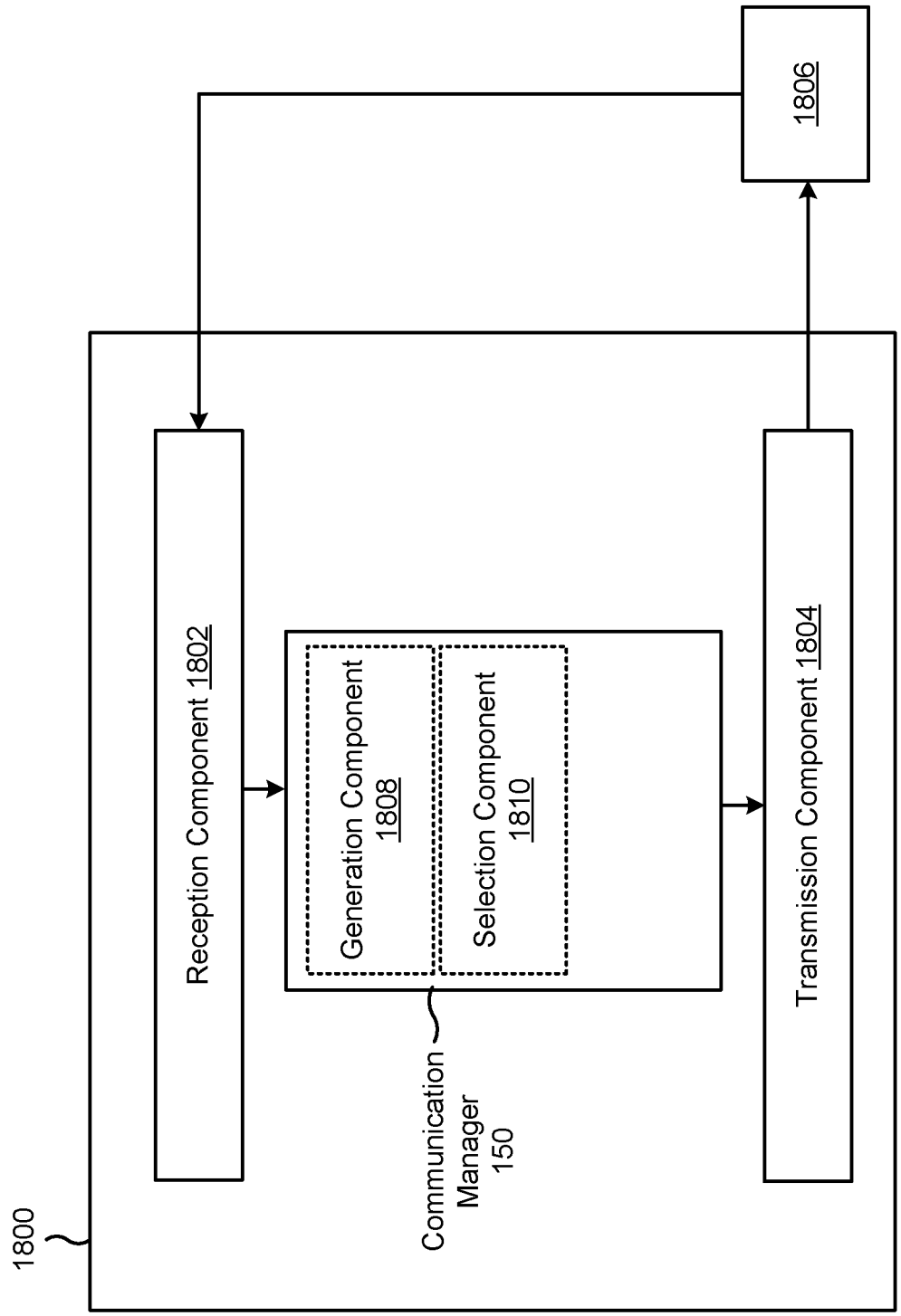

FIG. 18 is a diagram of an example apparatus 1800 for wireless communication. The apparatus 1800 may be a base station (e.g., base station 110), or a base station may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include the communication manager 150. The communication manager 150 may include a generation component 1808 and/or a selection component 1810, among other examples.

In some aspects, the apparatus 1800 may be configured to perform one or more operations described herein in connection with FIGS. 1-11. Additionally, or alternatively, the apparatus 1800 may be configured to perform one or more processes described herein, such as process 1200 of FIG. 12. In some aspects, the apparatus 1800 and/or one or more components shown in FIG. 18 may include one or more components of the UE described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the base station described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the base station described in connection with FIG. 2. In some aspects, the transmission component 1804 may be co-located with the reception component 1802 in a transceiver.

The generation component 1808 may generate a DFT waveform from separate DFT inputs of data content, a GI sequence, and tail suppression samples. The generation component 1808 may generate a first communication with the DFT waveform using an IFFT operation. The first communication may include, in a time domain, a data signal corresponding to the data content and a GI-based tail signal that corresponds to the GI sequence and that is suppressed with a tail suppression signal based at least in part on the tail suppression samples. The transmission component 1804 may transmit the first communication.

The selection component 1810 may select the tail suppression samples to reduce data leakage from the GI-based tail signal. The selection component 1810 may select a quantity of the tail suppression samples based at least in part on a size of the data content. The selection component 1810 may select a type of the tail suppression samples based at least in part on the data content. The selection component 1810 may select the tail suppression samples to have a negative value that is based at least in part on a product of an inverse of a second tail matrix component, a first tail matrix component, and a value of the data content. The selection component 1810 may select a quantity of the tail suppression samples based at least in part on an MCS for the data content.

The selection component 1810 may select a quantity of the tail suppression samples based at least in part on a circular property for DMRSs. The generation component 1808 may partially overlap the GI-based tail signal and the tail suppression signal according to a received indication.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a user equipment (UE), comprising: generating a DFT waveform from separate DFT inputs of data content, a guard interval (GI) sequence, and tail suppression samples; generating a first communication with the DFT waveform using an inverse fast Fourier transform (IFFT) operation, wherein the first communication includes, in a time domain, a data signal corresponding to the data content and a GI-based tail signal that corresponds to the GI sequence and that is suppressed with a tail suppression signal based at least in part on the tail suppression samples; and transmitting the first communication.

Aspect 2: The method of Aspect 1, further comprising selecting the tail suppression samples to reduce data leakage from the GI-based tail signal.

Aspect 3: The method of Aspect 1 or 2, further comprising selecting a quantity of the tail suppression samples based at least in part on a size of the data content.

Aspect 4: The method of any of Aspects 1-3, further comprising selecting a type of the tail suppression samples based at least in part on the data content.

Aspect 5: The method of any of Aspects 1-4, further comprising selecting the tail suppression samples to have a negative value that is based at least in part on a product of an inverse of a second tail matrix component, a first tail matrix component, and a value of the data content.

Aspect 6: The method of any of Aspects 1-5, further comprising selecting a quantity of the tail suppression samples based at least in part on a modulation and coding scheme for the data content.

Aspect 7: The method of any of Aspects 1-6, further comprising selecting a quantity of the tail suppression samples based at least in part on a circular property for demodulation reference signals.

Aspect 8: The method of any of Aspects 1-7, wherein generating the first communication includes generating the first communication for single-carrier frequency domain equalization with up-sampling.

Aspect 9: The method of any of Aspects 1-8, further comprising partially overlapping the GI-based tail signal and the tail suppression signal according to a received indication.

Aspect 10: The method of any of Aspects 1-9, further comprising transmitting an indication of a UE capability for suppression signal generation or reception.

Aspect 11: A method of wireless communication performed by a base station, comprising: transmitting, to a user equipment (UE), an indication of tail suppression samples that the UE is to use for generating a discrete Fourier transform (DFT) waveform from separate DFT inputs of data content, a guard interval (GI) sequence, and the tail suppression samples; and receiving a first communication that includes a data signal corresponding to the data content, a GI-based tail signal that corresponds to the GI sequence, and a tail suppression signal that corresponds to the tail suppression samples.

Aspect 12: The method of Aspect 11, further comprising selecting the tail suppression samples based at least in part on a modulation and coding scheme for the data content.

Aspect 13: The method of Aspect 11 or 12, further comprising selecting the tail suppression samples based at least in part on a circular property for demodulation reference signals.

Aspect 14: The method of any of Aspects 11-13, further comprising performing single-carrier frequency domain equalization with up-sampling to decode the first communication.

Aspect 15: The method of any of Aspects 11-14, wherein the indication indicates whether the GI-based tail signal and the tail suppression signal are to partially overlap.

Aspect 16: The method of any of Aspects 11-15, further comprising receiving an indication of a UE capability for suppression signal generation or reception, and wherein the method includes selecting the tail suppression samples based at least in part on the UE capability.

Aspect 17: A method of wireless communication performed by a user equipment (UE), comprising: generating a discrete Fourier transform (DFT) waveform from separate DFT inputs of data content and a tail value; generating a first communication with the DFT waveform using an inverse fast Fourier transform (IFFT) operation, wherein the first communication includes, in a time domain, a data signal corresponding to the data content and a tail signal that corresponds to the tail value; transmitting the first communication in a first symbol; and transmitting a second communication in a second symbol using a copy of the tail signal used for the first communication as a guard interval (GI) for a data signal of the second communication.

Aspect 18: The method of Aspect 17, wherein the GI is a cyclic prefix.

Aspect 19: The method of Aspect 17 or 18, wherein the first symbol is a demodulation reference symbol.

Aspect 20: The method of Aspect 19, further comprising zero padding one or more of a first end or a second end of the data signal of the second communication.

Aspect 21: A method of wireless communication performed by a base station, comprising: generating a DFT waveform from separate DFT inputs of data content, a guard interval (GI) sequence, and tail suppression samples; generating a first communication with the DFT waveform using an inverse fast Fourier transform (IFFT) operation, wherein the first communication includes, in a time domain, a data signal corresponding to the data content and a GI-based tail signal that corresponds to the GI sequence and that is suppressed with a tail suppression signal based at least in part on the tail suppression samples; and transmitting the first communication.

Aspect 22: The method of Aspect 21, further comprising selecting the tail suppression samples to reduce data leakage from the GI-based tail signal.

Aspect 23: The method of Aspect 21 or 22, further comprising selecting a quantity of the tail suppression samples based at least in part on a size of the data content.

Aspect 24: The method of any of Aspects 21-23, further comprising selecting a type of the tail suppression samples based at least in part on the data content.

Aspect 25: The method of any of Aspects 21-24, further comprising selecting the tail suppression samples to have a negative value that is based at least in part on a product of an inverse of a second tail matrix component, a first tail matrix component, and a value of the data content.

Aspect 26: The method of any of Aspects 21-25, further comprising selecting a quantity of the tail suppression samples based at least in part on a modulation and coding scheme for the data content.

Aspect 27: The method of any of Aspects 21-26, further comprising selecting a quantity of the tail suppression samples based at least in part on a circular property for demodulation reference signals.

Aspect 28: The method of any of Aspects 21-27, wherein generating the first communication includes generating the first communication for single-carrier frequency domain equalization with up-sampling.

Aspect 29: The method of any of Aspects 21-28, wherein transmitting the first communication includes transmitting the first communication in a first symbol, and wherein the method includes transmitting a second communication in a second symbol using a copy of a tail signal used for the first communication as a GI for a data signal of the second communication.

Aspect 30: An apparatus for wireless communication at a device, comprising a processor; memory coupled with the processor; and instructions stored in the memory and executable by the processor to cause the apparatus to perform the method of one or more of Aspects 1-29.

Aspect 31: A device for wireless communication, comprising a memory and one or more processors coupled to the memory, the one or more processors configured to perform the method of one or more of Aspects 1-29.

Aspect 32: An apparatus for wireless communication, comprising at least one means for performing the method of one or more of Aspects 1-29.

Aspect 33: A non-transitory computer-readable medium storing code for wireless communication, the code comprising instructions executable by a processor to perform the method of one or more of Aspects 1-29.

Aspect 34: A non-transitory computer-readable medium storing a set of instructions for wireless communication, the set of instructions comprising one or more instructions that, when executed by one or more processors of a device, cause the device to perform the method of one or more of Aspects 1-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      generate a discrete Fourier transform (DFT) waveform from separate DFT inputs of data content, a guard interval (GI) sequence, and tail suppression samples, the tail suppression samples being selected to have a negative value that is based at least in part on a product of an inverse of a second tail matrix component, a first tail matrix component, and a value of the data content;
      generate a first communication with the DFT waveform using an inverse fast Fourier transform (IFFT) operation, wherein the first communication includes, in a time domain, a data signal corresponding to the data content and a GI-based tail signal that corresponds to the GI sequence and that is suppressed with a tail suppression signal based at least in part on the tail suppression samples; and
      transmit the first communication.

2. The UE of claim 1, wherein the one or more processors are configured to select the tail suppression samples to reduce data leakage from the GI-based tail signal.

3. The UE of claim 1, wherein the one or more processors are configured to select a quantity of the tail suppression samples based at least in part on a size of the data content.

4. The UE of claim 1, wherein the one or more processors are configured to select a type of the tail suppression samples based at least in part on the data content.

5. The UE of claim 1, wherein the one or more processors are configured to select a quantity of the tail suppression samples based at least in part on a modulation and coding scheme for the data content.

6. The UE of claim 1, wherein the one or more processors are configured to select a quantity of the tail suppression samples based at least in part on a circular property for demodulation reference signals.

7. The UE of claim 1, wherein the one or more processors, to generate the first communication, are configured to generate the first communication for single-carrier frequency domain equalization with up-sampling.

8. The UE of claim 1, wherein the one or more processors are configured to partially overlap the GI-based tail signal and the tail suppression signal according to a received indication.

9. The UE of claim 1, wherein the one or more processors are configured to transmit an indication of a UE capability for suppression signal generation or reception.

10. The UE of claim 1, wherein the tail suppression samples associated with a set of allocated time domain resource elements that is separate from resource elements associated with at least one of the other separate DFT inputs.

11. A network entity for wireless communication, comprising:
one or more memories; and
one or more processors, coupled to the one or more memories, configured to:
generate a discrete Fourier transform (DFT) waveform from separate DFT inputs of data content, a guard interval (GI) sequence, and tail suppression samples, the tail suppression samples being selected to have a negative value that is based at least in part on a product of an inverse of a second tail matrix component, a first tail matrix component, and a value of the data content;
generate a first communication with the DFT waveform using an inverse fast Fourier transform (IFFT) operation, wherein the first communication includes, in a time domain, a data signal corresponding to the data content and a GI-based tail signal that corresponds to the GI sequence and that is suppressed with a tail suppression signal based at least in part on the tail suppression samples; and
transmit the first communication.

12. The network entity of claim 11, wherein the one or more processors are configured to select the tail suppression samples to reduce data leakage from the GI-based tail signal.

13. The network entity of claim 11, wherein the one or more processors are configured to select a quantity of the tail suppression samples based at least in part on a size of the data content.

14. The network entity of claim 11, wherein the one or more processors are configured to select a type of the tail suppression samples based at least in part on the data content.

15. The network entity of claim 11, wherein the one or more processors are configured to select a quantity of the tail suppression samples based at least in part on a modulation and coding scheme for the data content.

16. The network entity of claim 11, wherein the one or more processors are configured to select a quantity of the tail suppression samples based at least in part on a circular property for demodulation reference signals.

17. The network entity of claim 11, wherein the one or more processors, to generate the first communication, are configured to generate the first communication for single-carrier frequency domain equalization with up-sampling.

18. The network entity of claim 11, wherein the one or more processors are configured to partially overlap the GI-based tail signal and the tail suppression signal according to a received indication.

19. The network entity of claim 11, wherein the one or more processors, to transmit the first communication, are configured to transmit the first communication in a first symbol, and wherein the one or more processors are configured to transmit a second communication in a second symbol using a copy of a tail signal used for the first communication as a GI for a data signal of the second communication.

20. The network entity of claim 19, wherein the first symbol is a demodulation reference symbol.

21. The network entity of claim 11, wherein the one or more processors are configured to receive an indication of a UE capability for suppression signal generation or reception, and wherein the one or more processors are configured to select the tail suppression samples based at least in part on the UE capability.

22. The network entity of claim 11, wherein the tail suppression samples associated with a set of allocated time domain resource elements that is separate from resource elements associated with at least one of the other separate DFT inputs.

23. A method of wireless communication performed by a user equipment (UE), comprising:
generating a discrete Fourier transform (DFT) waveform from separate DFT inputs of data content, a guard interval (GI) sequence, and tail suppression samples, the tail suppression samples being selected to have a negative value that is based at least in part on a product of an inverse of a second tail matrix component, a first tail matrix component, and a value of the data content;
generating a first communication with the DFT waveform using an inverse fast Fourier transform (IFFT) operation, wherein the first communication includes, in a time domain, a data signal corresponding to the data content and a GI-based tail signal that corresponds to the GI sequence and that is suppressed with a tail suppression signal based at least in part on the tail suppression samples; and
transmitting the first communication.

24. The method of claim 23, further comprising:
selecting the tail suppression samples to reduce data leakage from the GI-based tail signal.

25. The method of claim 23, wherein, when generating the first communication, the method comprises:
generating the first communication for single-carrier frequency domain equalization with up-sampling.

26. The method of claim 23, further comprising:
selecting a quantity of the tail suppression samples based at least in part on a size of the data content, a modulation and coding scheme for the data content, or a circular property for demodulation reference signals.

27. A method of wireless communication performed by a network entity, comprising:
generating a discrete Fourier transform (DFT) waveform from separate DFT inputs of data content, a guard interval (GI) sequence, and tail suppression samples, the tail suppression samples being selected to have a negative value that is based at least in part on a product of an inverse of a second tail matrix component, a first tail matrix component, and a value of the data content;
generating a first communication with the DFT waveform using an inverse fast Fourier transform (IFFT) operation, wherein the first communication includes, in a time domain, a data signal corresponding to the data content and a GI-based tail signal that corresponds to the GI sequence and that is suppressed with a tail suppression signal based at least in part on the tail suppression samples; and
transmitting the first communication.

28. The method of claim 27, further comprising:
selecting the tail suppression samples to reduce data leakage from the GI-based tail signal.

29. The method of claim 27, wherein, when generating the first communication, the method comprises:
generating the first communication for single-carrier frequency domain equalization with up-sampling.

30. The method of claim 27, further comprising:
  selecting a quantity of the tail suppression samples based at least in part on a size of the data content, a modulation and coding scheme for the data content, or a circular property for demodulation reference signals.

\* \* \* \* \*